(12) United States Patent
Zhibin

(10) Patent No.: US 10,272,369 B2
(45) Date of Patent: Apr. 30, 2019

(54) REUSABLE FILTER SYSTEM

(71) Applicant: Hong Kong Ecoaqua Co., Limited, Hong Kong (CN)

(72) Inventor: Zou Zhibin, Qingdao (CN)

(73) Assignee: QINGDAO ECOPURE FILTER CO., LTD. (CN)

( * ) Notice: Subject to any disclaimer, the term of this patent is extended or adjusted under 35 U.S.C. 154(b) by 34 days.

(21) Appl. No.: 15/201,128

(22) Filed: Jul. 1, 2016

(65) Prior Publication Data

US 2018/0001237 A1 Jan. 4, 2018

(51) Int. Cl.
*B01D 29/11* (2006.01)
*B01D 35/153* (2006.01)
*B01D 35/30* (2006.01)
*B01D 35/12* (2006.01)

(52) U.S. Cl.
CPC ............ *B01D 35/12* (2013.01); *B01D 29/114* (2013.01); *B01D 35/153* (2013.01); *B01D 35/301* (2013.01); *B01D 2201/4092* (2013.01)

(58) Field of Classification Search
CPC .... B01D 35/12; B01D 35/153; B01D 35/301; B01D 29/114; B01D 2201/4092
USPC ....... 210/234, 235, 440–444, 282, 340, 341, 210/335, 449, 232
See application file for complete search history.

(56) References Cited

U.S. PATENT DOCUMENTS

| | | | |
|---|---|---|---|
| 5,022,986 A * | 6/1991 | Lang | B01D 29/114 210/232 |
| 5,700,371 A | 12/1997 | Koslow | |
| RE37,216 E | 6/2001 | Koslow | |
| 6,379,560 B1 * | 4/2002 | Tilp | B01D 35/303 210/195.1 |
| 7,067,054 B2 | 6/2006 | Fritze | |
| 7,182,857 B2 | 2/2007 | Koslow et al. | |
| 7,470,364 B2 | 12/2008 | Oranski et al. | |
| 7,540,957 B1 * | 6/2009 | Kurth | B01D 61/025 156/293 |
| 7,703,382 B2 | 4/2010 | Oranski et al. | |
| 2003/0024860 A1 | 2/2003 | Fritze | |
| 2006/0191827 A1 | 8/2006 | Fritze | |
| 2014/0048469 A1 | 2/2014 | Wilder et al. | |
| 2014/0217003 A1 | 8/2014 | Huda et al. | |

(Continued)

FOREIGN PATENT DOCUMENTS

AU 2016204166 A1 6/2016
AU 2016204864 A1 7/2016
(Continued)

OTHER PUBLICATIONS

U.S. Appl. No. 29/618,349, filed Sep. 20, 2017, Zou Zhibin.
(Continued)

*Primary Examiner* — Madeline Gonzalez
(74) *Attorney, Agent, or Firm* — David R. Stevens; Stevens Law Group

(57) ABSTRACT

A reusable fluid filter system is disclosed. The fluid filter system includes a reusable fluid filter unit that encloses two or more filter elements. The reusable filter unit is removably connected to a manifold. After removing the filter unit form the manifold, the bottom portion of each filter housing may be manually removed, and each filter may be manually replaced.

18 Claims, 22 Drawing Sheets

(56) References Cited

U.S. PATENT DOCUMENTS

| | | | |
|---|---|---|---|
| 2015/0151222 A1* | 6/2015 | Simmons | B01D 35/301 |
| | | | 210/323.2 |
| 2015/0157967 A1* | 6/2015 | Krause | B01D 35/153 |
| | | | 62/318 |
| 2017/0304751 A1 | 10/2017 | Zhibin | |
| 2017/0340993 A1 | 11/2017 | Zhibin | |
| 2018/0001241 A1 | 1/2018 | Zhibin | |

FOREIGN PATENT DOCUMENTS

| | | |
|---|---|---|
| EP | 3 248 664 A1 | 11/2017 |
| EP | 3 263 201 A1 | 1/2018 |
| WO | WO 2018/000254 A1 | 1/2018 |

OTHER PUBLICATIONS

U.S. Appl. No. 29/618,350, filed Sep. 20, 2017, Zou Zhibin.
U.S. Appl. No. 29/618,779, filed Sep. 24, 2017, Zou Zhibin.
U.S. Appl. No. 29/619,251, filed Sep. 27, 2017, Zou Zhibin.

\* cited by examiner

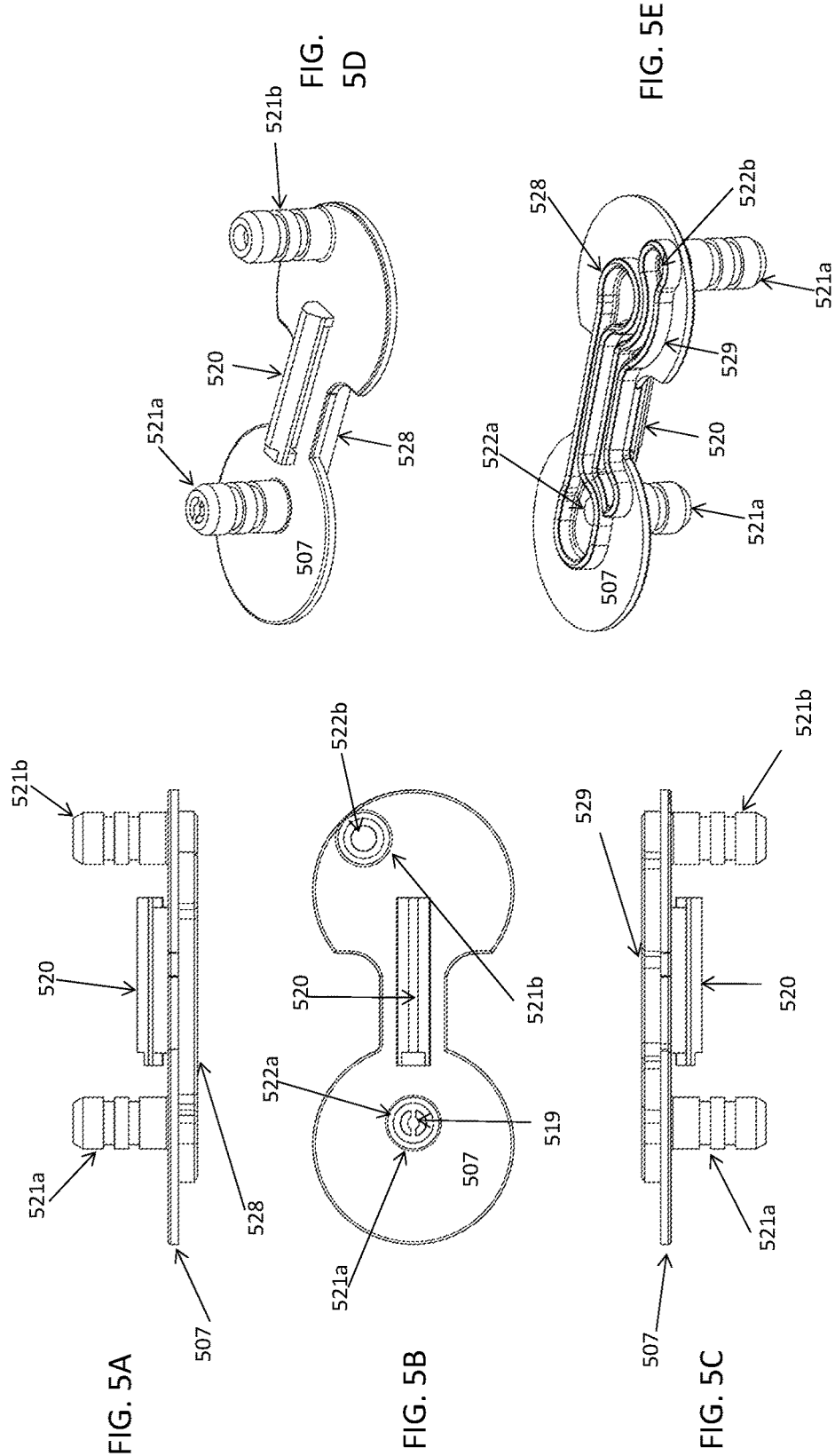

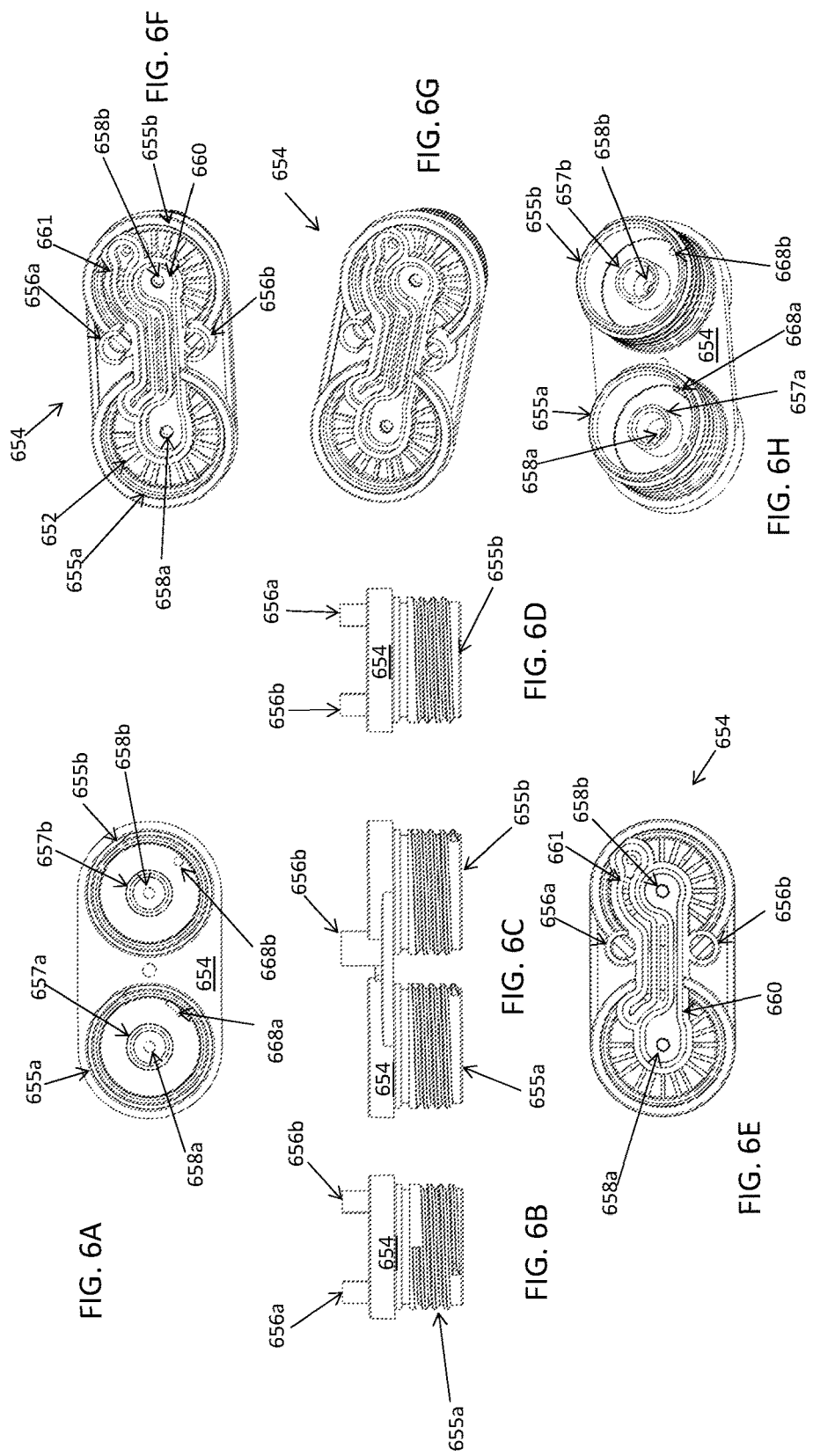

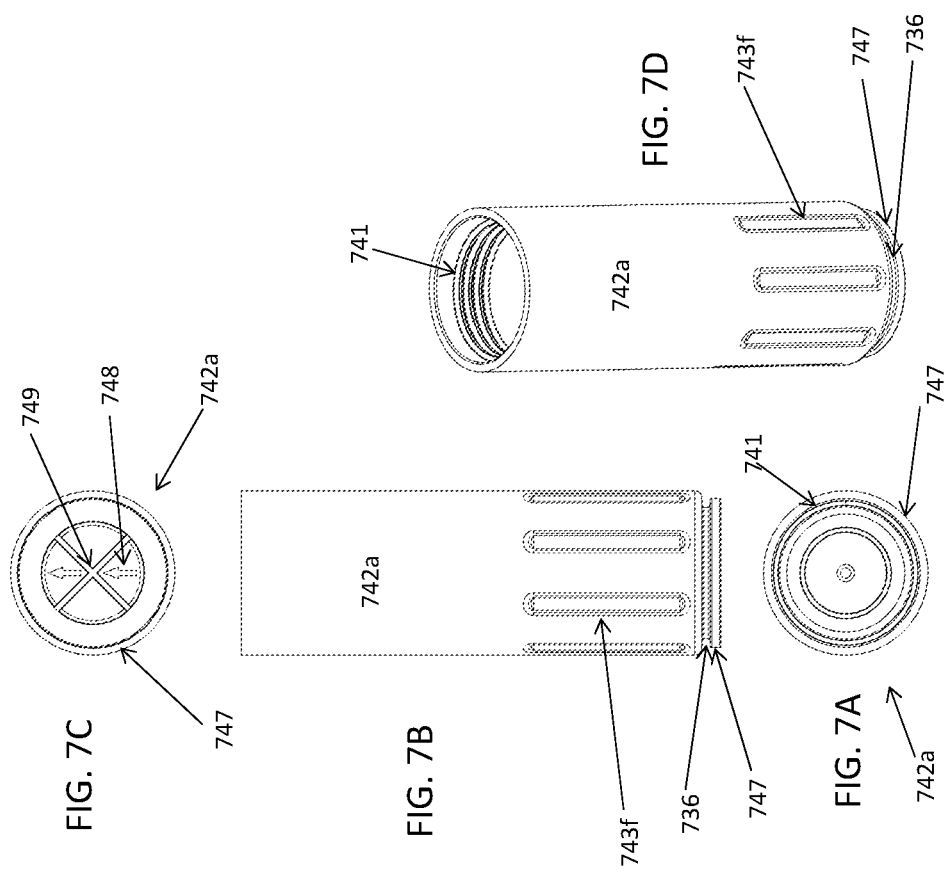

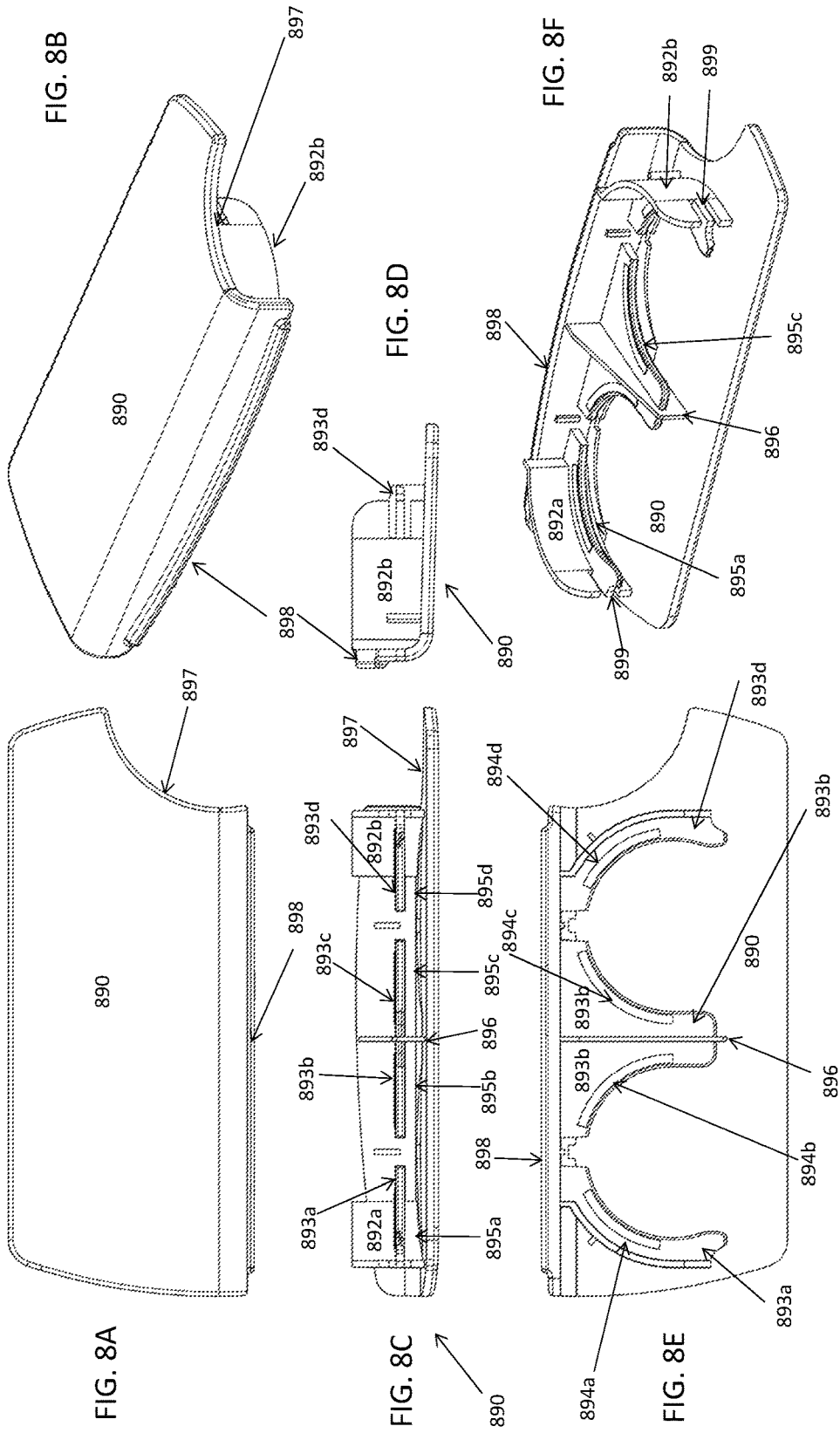

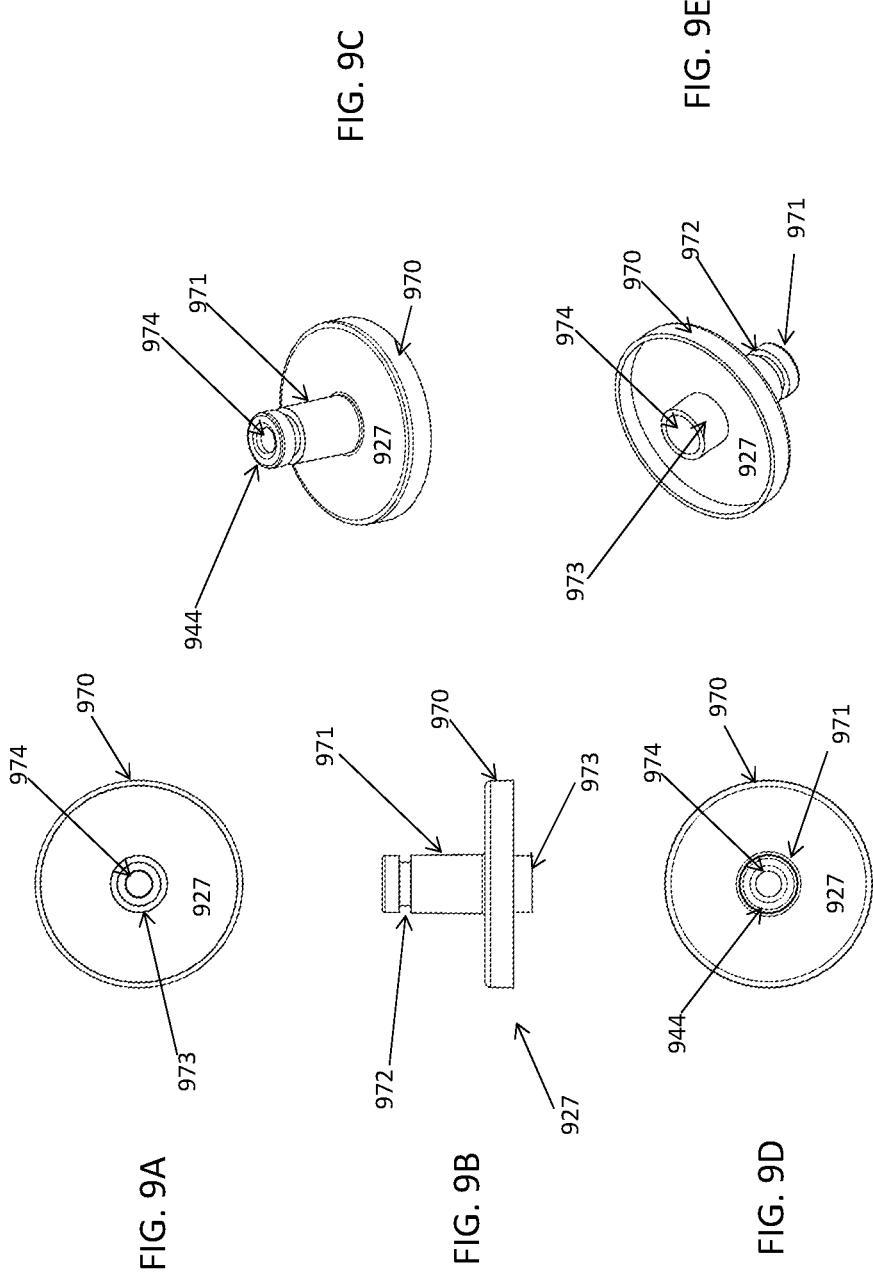

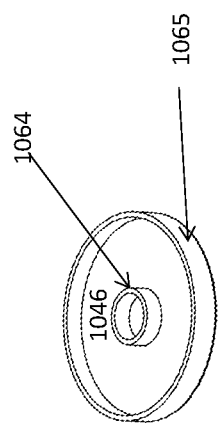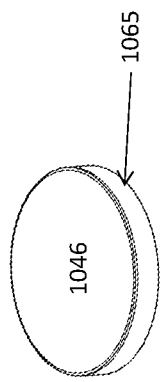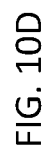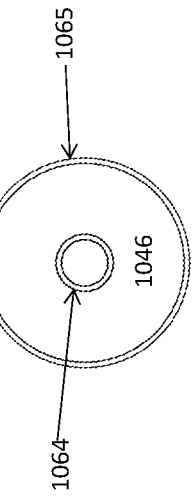
FIG. 10C
FIG. 10D
FIG. 10A
FIG. 10B

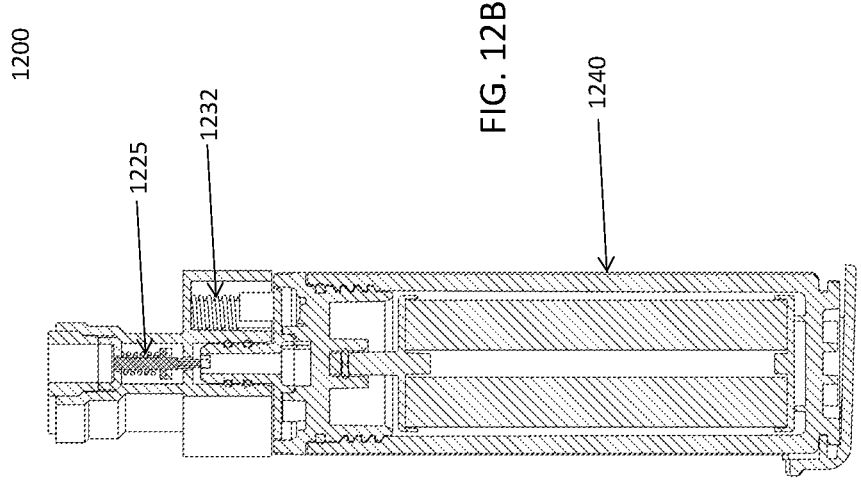
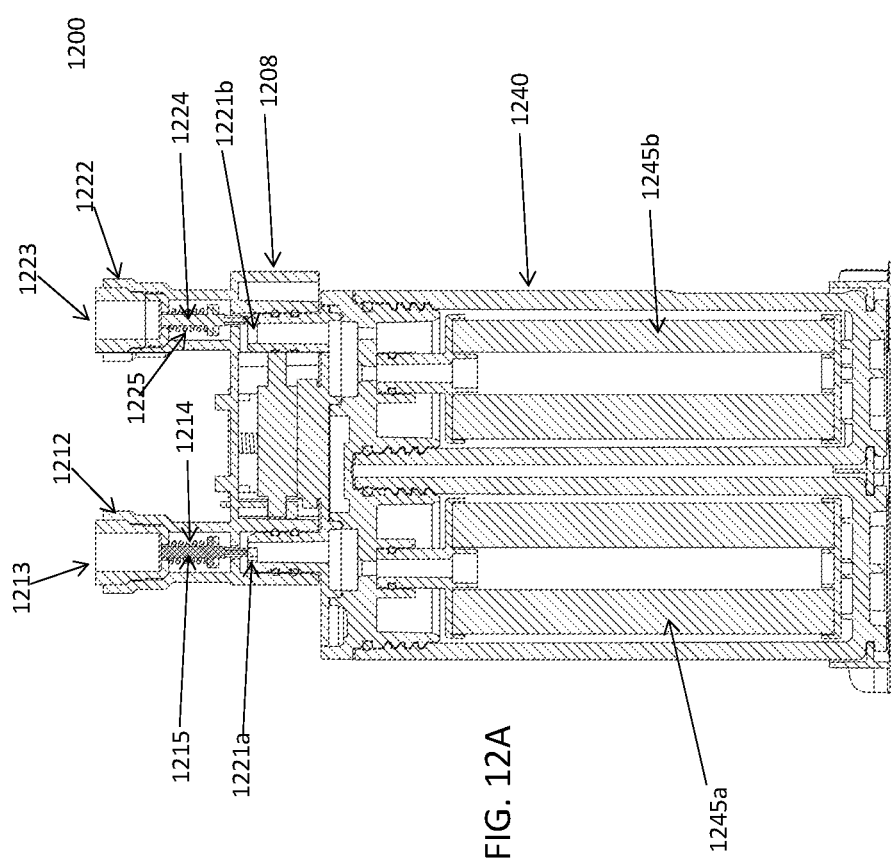

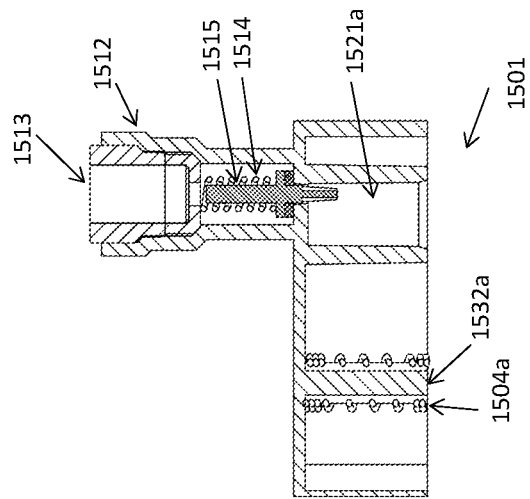
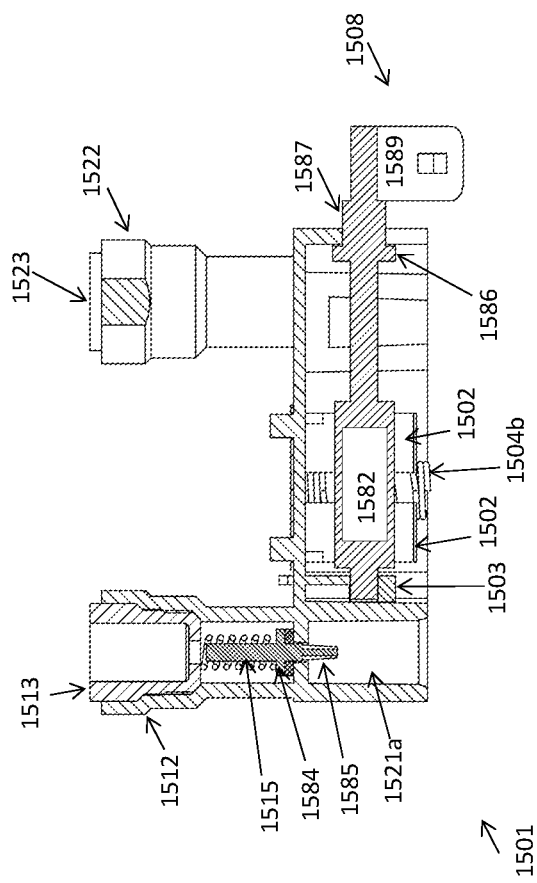
FIG. 15B
FIG. 15A

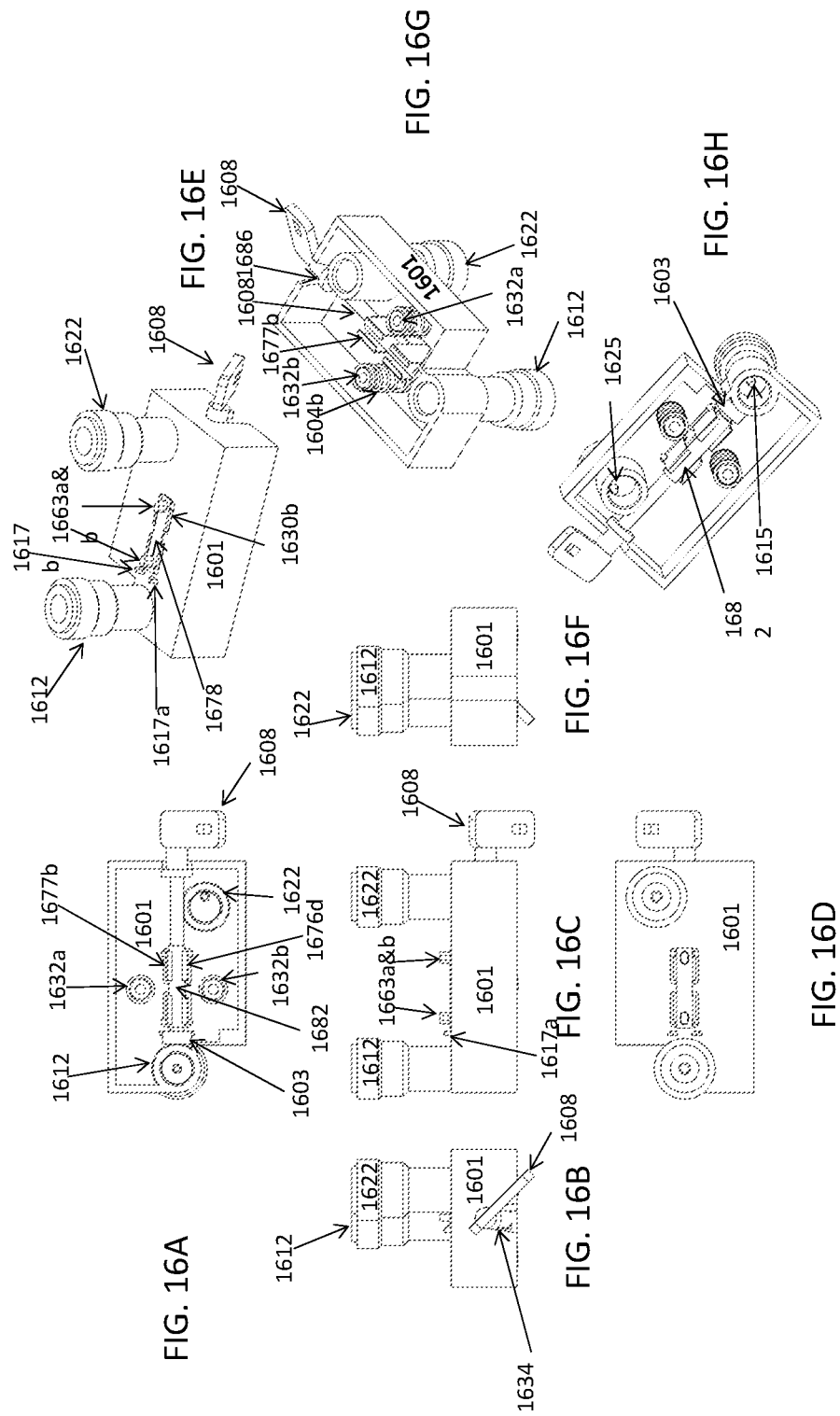

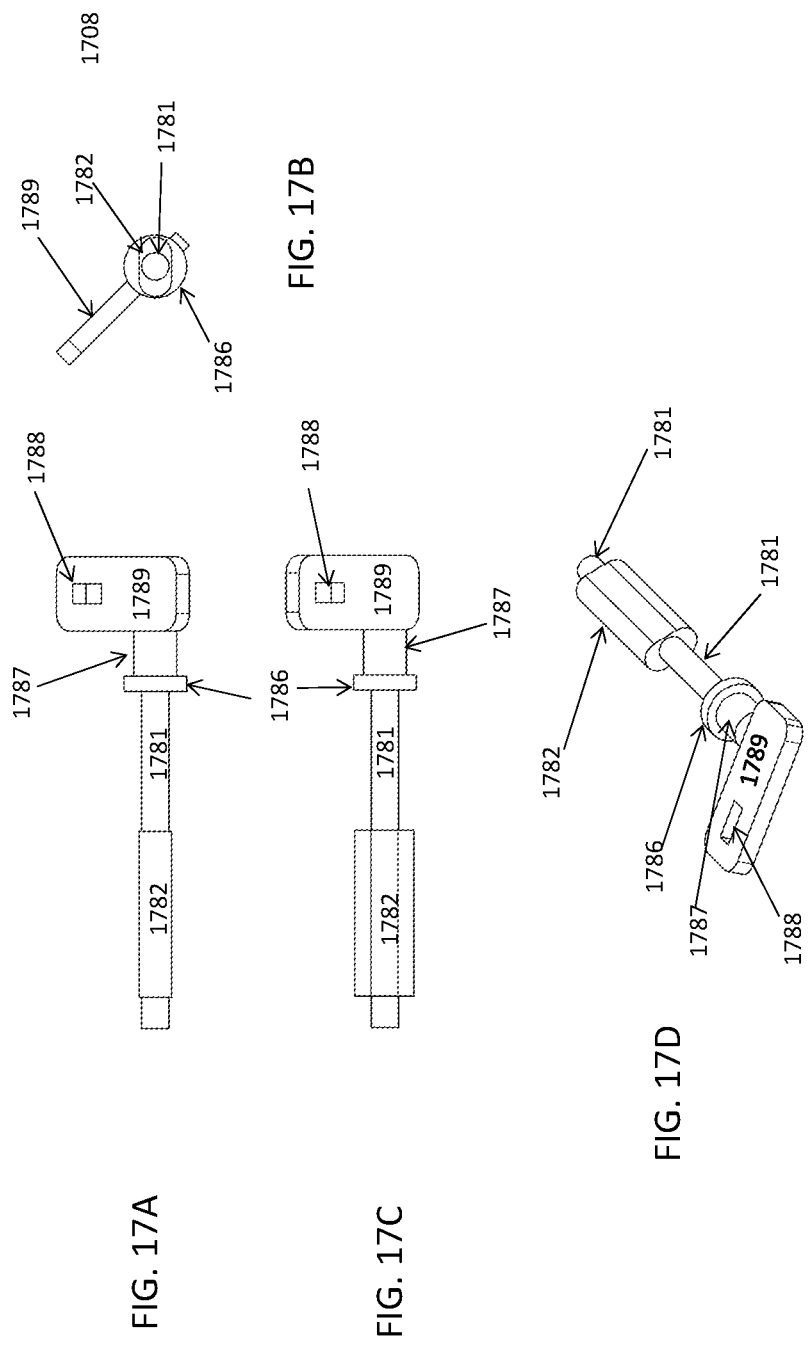

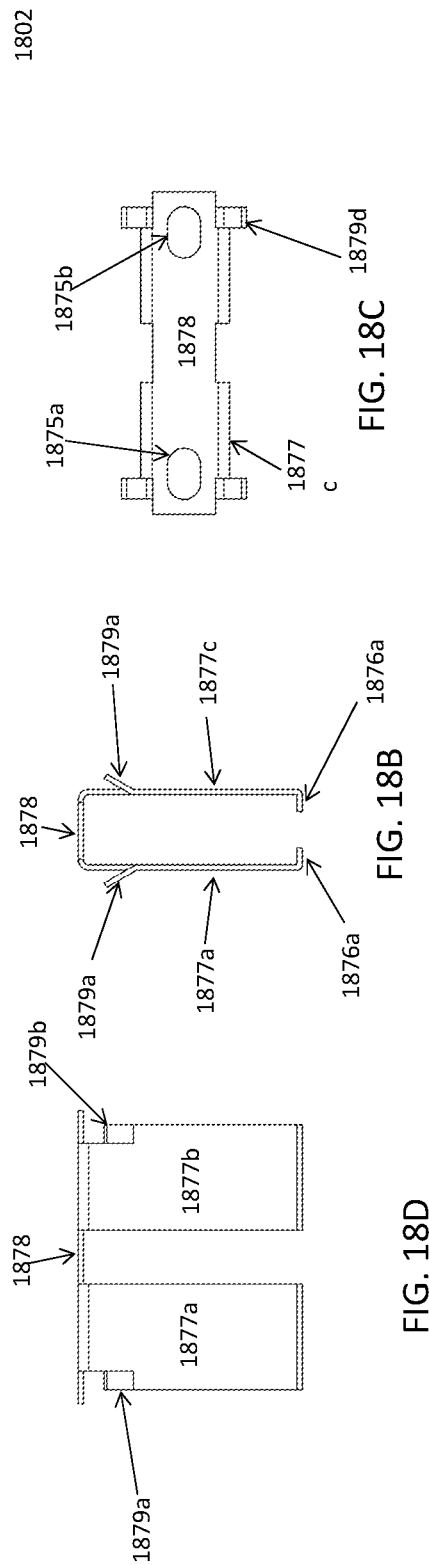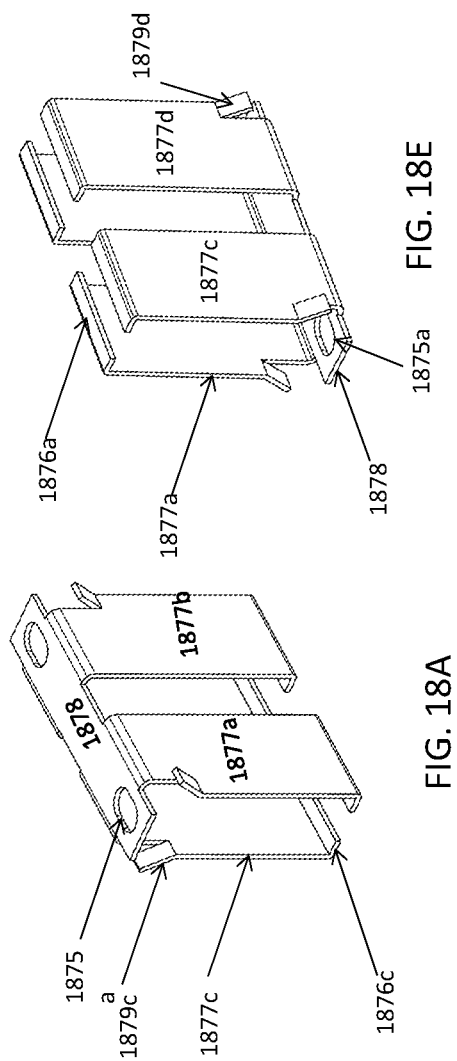

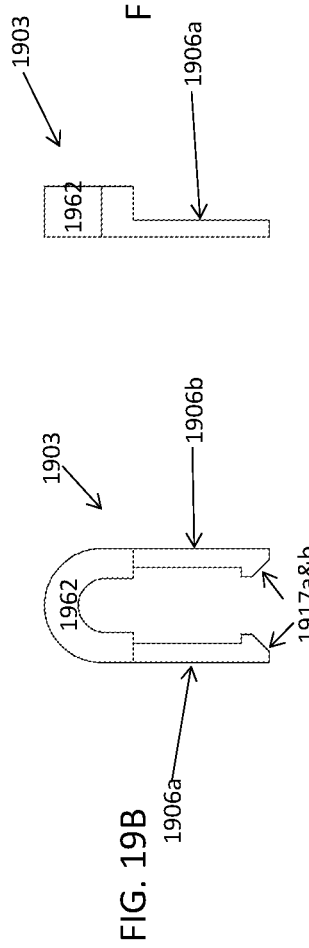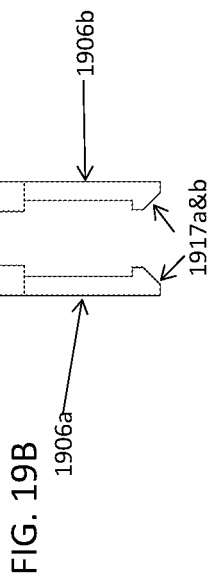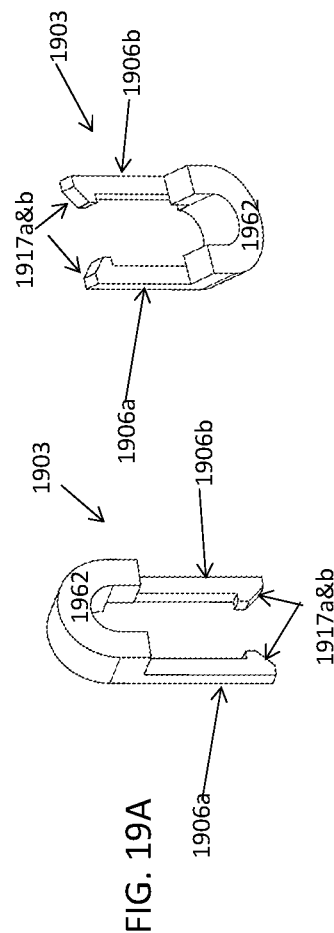
FIG. 19D
FIG. 19C
FIG. 19F
FIG. 19E
FIG. 19B
FIG. 19A

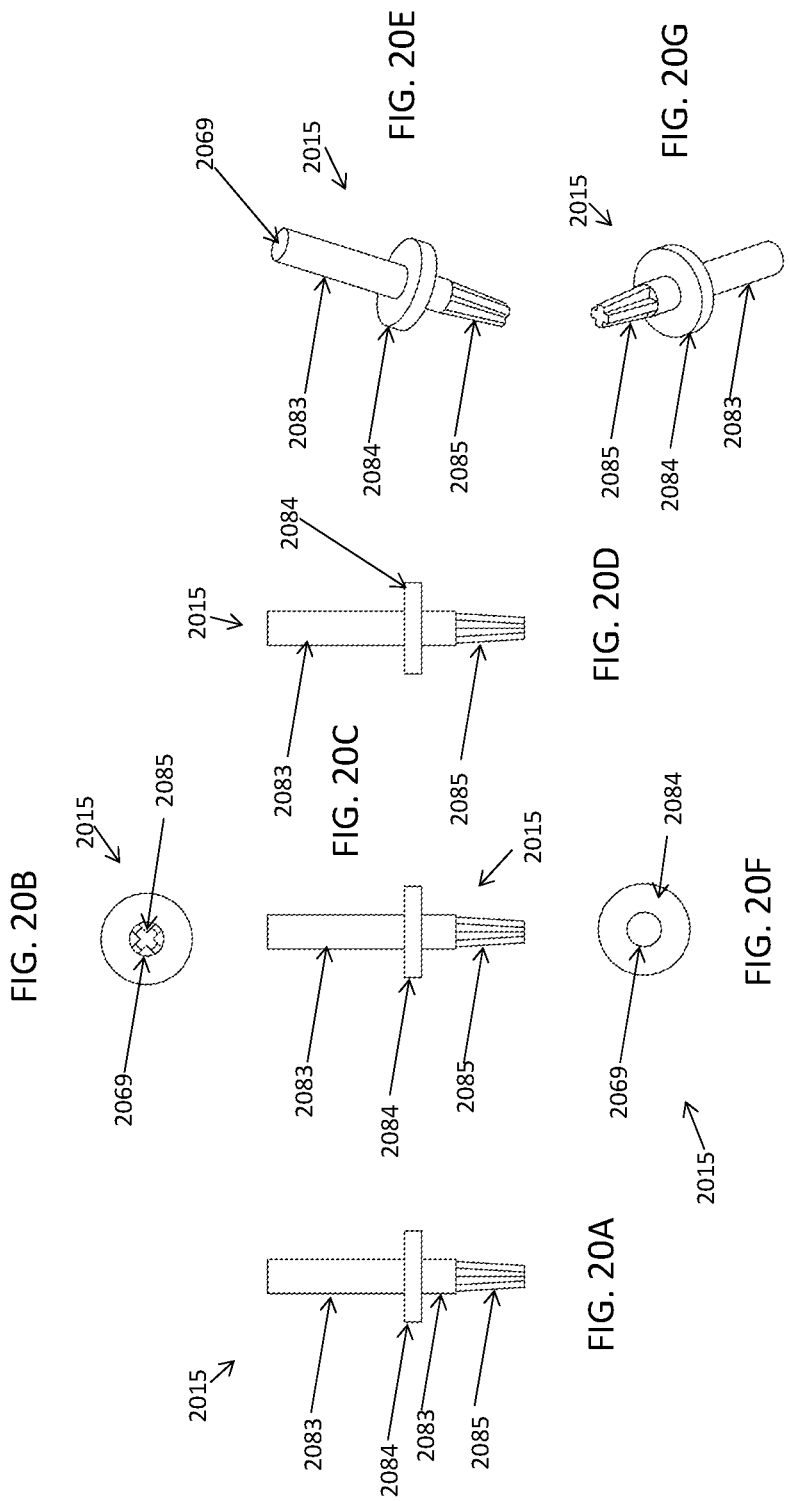

REUSABLE FILTER SYSTEM

FIELD

This specification relates generally to the purification of fluid.

BACKGROUND

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represent different approaches, which in and of themselves may also be inventions.

Fluid filter systems remove impurities from fluids, such as water, so as to fulfill various requirements (e.g., for drinking purpose, medical use, industrial use, etc.). This specification recognizes the need for replacing filters in filter cartridges.

BRIEF DESCRIPTION OF THE FIGURES

In the following drawings like reference numbers are used to refer to like elements. Although the following figures depict various examples of the invention, the invention is not limited to the examples depicted in the figures.

FIG. 1A shows a bottom view of the fluid filter system with the manifold attached, FIG. 1B shows a front view of an embodiment of a fluid filter system with the manifold attached, FIG. 1C shows a top view of an embodiment of the fluid filter system, FIG. 1D shows a side view of an embodiment of a fluid filter system, FIG. 1E shows a perspective view of an embodiment of a fluid filter system from the right side.

FIG. 2A shows a bottom view of the fluid filter system without a manifold; FIG. 2B shows a side view an embodiment of a fluid filter system without the manifold attached, FIG. 2C shows a front view of an embodiment of a fluid filter system without the manifold, FIG. 2D shows a side view of an embodiment of a fluid filter system without the manifold, FIG. 2E shows a top view of the fluid filter system without the manifold, FIG. 2F shows a perspective view of an embodiment of a fluid filter system without the manifold, FIG. 2G shows a perspective view of an embodiment of a fluid filter system without the manifold;

FIGS. 5A-5E show an embodiment of a fluid distributor system for the fluid filter system, FIG. 5A shows a side view, FIG. 5B shows a top view of a fluid distributor system, FIG. 5C shows a side view of a fluid distributor system, FIG. 5D shows a perspective view from the top, and FIG. 5E shows a perspective view from the bottom of a fluid distributor system;

FIGS. 6A-6H show an embodiment of a housing cap for the filter unit of the fluid filter system, FIG. 6A shows a top view of a housing cap, FIG. 6B shows a side view from the right of a housing cap, FIG. 6C shows a front view of a housing cap, FIG. 6D shows a side view from the left of a housing cap, FIG. 6E shows a bottom view of a housing cap, FIG. 6F shows a bottom perspective view of a housing cap, FIG. 6G shows a bottom perspective view from the other side of a housing cap, and FIG. 6H shows a top perspective view of a housing cap;

FIGS. 7A-7D show an embodiment of a filter housing for the filter unit with the housing cap off, FIG. 7A shows the filter housing from the top view, FIG. 7B shows the filter housing from the side view, FIG. 7C shows the filter housing from the bottom view, and FIG. 7D shows the filter housing from a perspective top view;

FIGS. 8A-8F show an embodiment of the base of the fluid filter system, FIG. 8A shows a bottom view of the base, FIG. 8B shows a perspective bottom view of the base, FIG. 8C shows a front view of the base, FIG. 8D shows a side view of the base, FIG. 8E shows a top view of the base, and FIG. 8F shows a perspective top view of the base;

FIGS. 9A-9E show an embodiment of the filter cap for the fluid filter system, FIG. 9A shows a bottom view of the filter cap, FIG. 9B shows a side view of the filter cap, FIG. 9C shows a top perspective view of the filter cap, FIG. 9D shows a top view of the filter cap, and FIG. 9E shows a perspective view from the bottom of the filter cap;

FIGS. 10A-10D show an embodiment of the filter end cap for the fluid filter system, FIG. 10A shows a side view of the filter end cap, FIG. 10B shows a top view of the filter end cap, FIG. 10C shows a perspective view from the top of the filter end cap, and FIG. 10D shows a perspective view from the bottom of the filter end cap;

FIG. 11A shows a cross-section of a front view showing the fluid flow in a fluid filter system, and FIG. 11B shows a cross-section side view of the fluid flow in a fluid filter system;

FIGS. 12A and 12B shows a cross-section view of an embodiment of the fluid filter system, FIG. 12A shows a cross-section of a front view, and FIG. 12B shows a cross-section of a side view;

FIGS. 15A and B show cross-section views of a manifold as attached to the fluid filter system, FIG. 15A shows a front view and FIG. 15B shows a side view;

FIGS. 16A-16H show an embodiment of a manifold for a fluid filter system, FIG. 16A shows a bottom view, FIG. 16B shows a side view, FIG. 16C is a front view, FIG. 16D is a top view, FIG. 16E is a top perspective view, FIG. 16F is a side view, FIG. 16G is a bottom perspective view, and FIG. 16H is a bottom perspective view;

FIGS. 17A-17D show an embodiment of the key for the fluid filter system, FIG. 17A shows a side view, FIG. 17B shows a bottom view, FIG. 17C shows a front view, and FIG. 17D shows a perspective view;

FIGS. 18A-18E show an embodiment of a filter clip for the fluid filter system, FIG. 18A shows a top perspective view, FIG. 18B shows a side view, FIG. 18C shows a top view, FIG. 18D shows a front view, and FIG. 18E shows a bottom perspective view;

FIGS. 19A-19F show an embodiment of a key clip for the fluid filter system, FIG. 19A shows a perspective view of a key clip, FIG. 19B shows a front view of a key clip, FIG. 19C shows a side view of a key clip, FIG. 19D shows a top view of a key clip, FIG. 19E shows a bottom view of a key clip, and FIG. 19F shows a bottom perspective view of a key clip;

FIGS. 20A-G show an embodiment of a valve for the fluid filter system, FIG. 20A shows a front view of a valve, FIG. 20B shows a bottom view of a valve, FIG. 20C shows a side view of a valve, FIG. 20D shows a side view of a valve, FIG. 20E shows a perspective view of a valve, FIG. 20F shows a top view of a valve, FIG. 20G shows a bottom perspective view of a valve;

DETAILED DESCRIPTION

Figure 1:
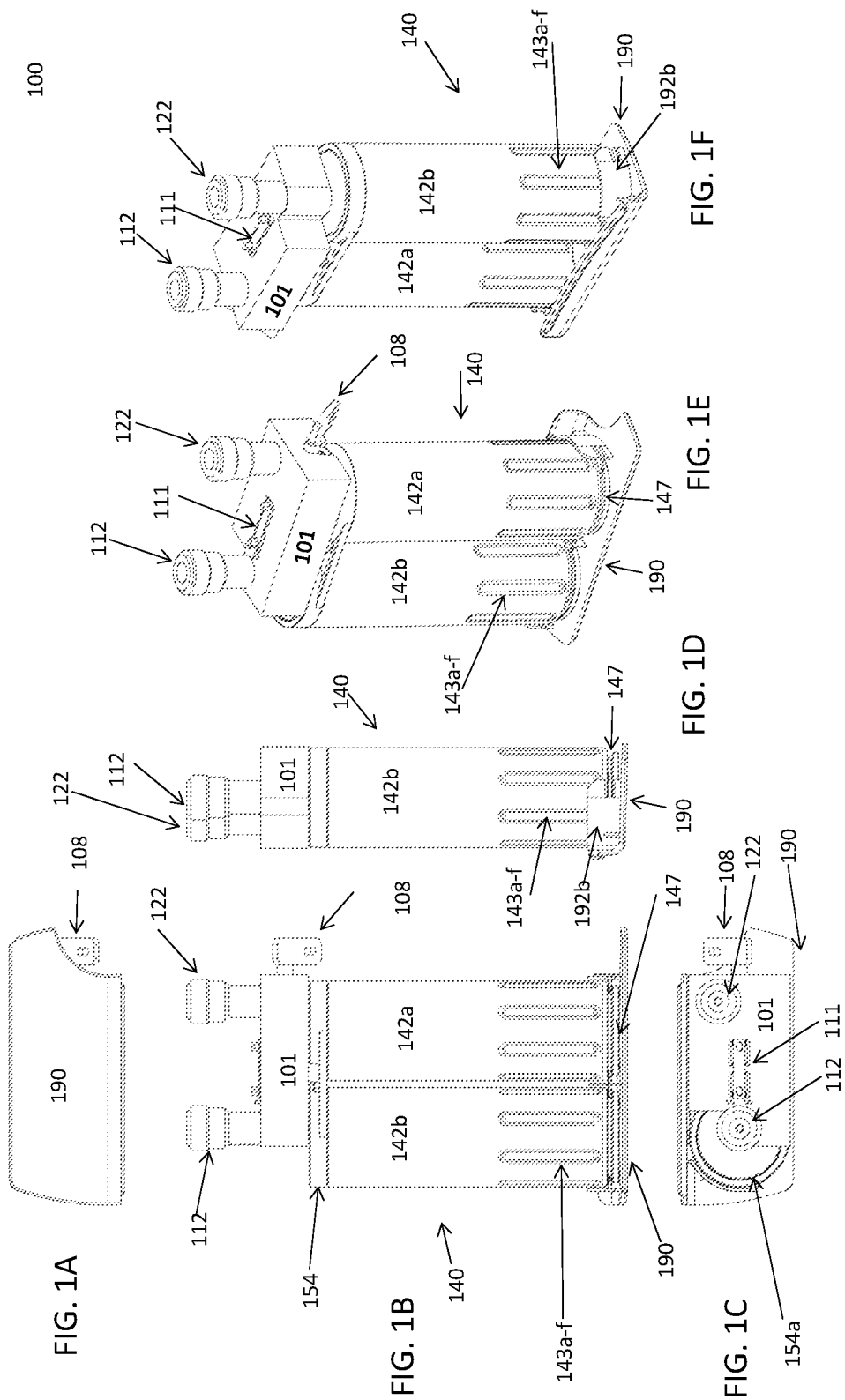
FIGS. 1A-1E shows a diagram of an embodiment of a fluid filter system.
FIG. 1F shows a perspective view of an embodiment of a fluid filter system from the left side.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1A-20G is a brief description of each element. After the brief description of each element, each element is further discussed, usually in numerical order, but there is no one location where all of the information of any element of FIGS. 1A-20G is necessarily located. Unique information about any particular element or any other aspect of any of FIGS. 1A-20G may be found in, or implied by, any part of the specification.

FIGS. 1A-1E show a diagram of an embodiment of a fluid filter system 100. In at least one embodiment, the fluid filter system 100 includes one or more removable filter cartridges, which has a removable filter within. In this specification, the terms "removable," "removably," and "detachable" refer to being easily removable by hand (e.g., without tools other than the key that is part of the system and without damaging the parts of the system).

FIG. 1A shows a bottom view of an embodiment of the fluid filter system 100 with the manifold attached. The bottom of the fluid filter system 100 is the bottom of the base. The fluid filter system includes the base 190 and key 108. In other embodiments, the fluid filter system 100 may not include all of the components listed and/or may include other components in addition to or instead of those listed above.

Fluid filter system 100 filters a fluid. In an embodiment, filter system 100 filters water for human consumption. Filter system 100 may be used in a refrigerator, such as to filter water prior to being made into ice. Alternatively, or additionally, filter system 100 may be used in an appliance that dispenses water. The base 190 functions as a stable platform for the fluid filter system. The base 190 is formed to allow the stable and removable attachment of the filter unit 140. In at least one embodiment, each filter housing of the filter unit separately slides into a half circular housing formed on the top of the base 190 and is held stably but removably. As shown in FIG. 1F, the base 190 may include a lip in the back (a back wall) that can provide additional stability. The shape of the base 190 may be any shape that provides stability. The base 190 in FIGS. 1A-1E may be configured to be of an approximately rectangular shape and may have a "foot" below the key.

Key 108 functions as a lever to separate the manifold from the filter cartridges during the process of removing and changing one or more of the filters and/or filter cartridges. When a user turns the key 108 clockwise or counterclockwise 90 degrees the manifold is unlocked from the rest of the fluid filter system 100. However, other types of levers can be used instead of the key as long as they are able to be manipulated to unlock or lock the manifold onto the filter unit. In other embodiments key 108 may need to be rotated a different number of degrees to separate the filter cartridge from the manifold (e.g., 5 degrees, 15 degrees, 30 degrees, 180 degrees or a different amount).

FIG. 1B shows a front view of an embodiment of a fluid filter system 100 with the manifold attached. The fluid filter system 100 may include manifold 101, key 108, outlet port 112, inlet port 122, filter unit 140, filter housing 142a and 142b, indents 143a-f, housing end cap 147, housing cap 154, and base 190. In other embodiments, the manifold 101 may not include all of the components listed and/or may include other components in addition to or instead of those listed above.

The fluid filter system 100 includes a manifold 101 that is removably connected to a filter unit of the fluid filter system 100 that encloses a filter. In this specification, the terms "filter unit" and "body" (e.g., the body of fluid filter system 100) may be used interchangeably and may be substituted one for another to obtain other embodiments. Unfiltered fluid runs through an inlet port of the manifold, and is then directed to one or more filters inside the filter unit to be filtered. The filtered fluid is subsequently directed out of an outlet port of the manifold and sent to its point of use. A detachable housing cap is connected to the filter unit, which can be detached so that the filter can be replaced. In this specification, the side of the manifold 101 facing away from the filter unit is referred as the top side of the fluid filter system 100, while the end of the filter unit away from the manifold 101 is referred to as the bottom side of the fluid filter system 100. In this specification, the terms "filter," "filter element," and "filter media" may be interchanged with one another to obtain different embodiments. In this specification, the terms "fluid" and "water" may be interchanged with one another to obtain different embodiments.

Manifold 101 is a structure attached to the top of the fluid filter system 100 that includes an inlet port for receiving unfiltered fluid from a fluid source/supply and an outlet port for transporting filtered fluid out of the fluid filter system 100. Manifold 101 connects to a source of a fluid that the user wants to filter and to a location with the fluid is used, such as an ice maker, a faucet, spigot, or other outlet or location for the filtered fluid, In at least one embodiment, the manifold 101 interfaces with the filter unit of the fluid filter system 100 that encloses one or more filters. The manifold 101 includes molded channels to direct incoming unfiltered fluid to the one or more filters while allowing filtered fluid to be transported out of the manifold 101. In at least one embodiment, the manifold 101 includes at least one mechanically driven valve that is used to control the access of unfiltered fluid into the filter unit of the fluid filter system 100.

Key 108 is a lever that removes the manifold 101. For example, key 108 can be turned to release a spring in the manifold that detaches the manifold from the rest of the filter unit. The direction that the key is turned to attach or detach the manifold may depend upon the construction of the key.

More details about an embodiment of the construction of the key is provided in FIG. 17, for example.

Outlet port 112 includes a tubular structure having an outlet channel that may be connected to an outlet tubing that transports filtered fluid out of the fluid filter system 100 to the point of use. The outlet port 112 receives filtered fluid from the core member of the manifold 101 and directs filtered fluid out of the manifold 101. In this specification, the terms "tube," "tubular structure," "tubing," "space," "channel," and "conduit" may be interchanged with one another to obtain different embodiments.

Inlet port 122 includes a tubular structure having an inlet channel that may be connected to a fluid source/supply for receiving a flow of unfiltered fluid. The inlet port 122 directs the unfiltered fluid into a core member of the manifold 101.

Filter unit 140 is a portion of the fluid filter system 100 that encloses two filters, each in a separate filter housing. Filter unit 140 may be a removable filter cartridge having a removable cap, via which the filter maybe replaced. In at least one embodiment, the filter unit 140 includes channels/spaces that are coupled to the inlet and outlet channels of the manifold 101 to form a fluid-tight container during use of the fluid filter system 100. The filter unit 140 receives unfiltered fluid, via the inlet channel of the manifold 101, filters the fluid, and then directs the filtered fluid through the outlet channel of the manifold 101 and then directs the filtered fluid out of the fluid filter system 100. In some embodiments, each filter housing of the filter unit 140 can be separately removed and replaced. Alternatively, each filter within each filter housing can be separately removed and replaced.

Filter housings 142a and 142b are housings that are each connected to an end cap to form two containers in the filter unit 140 for holding two filters. In at least one embodiment, the top of each housing 142a and 142b is coupled to the manifold 101, while the bottom end of each housing 142a and 142b is sealed by an end cap while in use.

Indents 143a-f are indentations on each housing 142a and 142b that provide a grip for removing each housing 142a and 142b from a base. The indents may also function as a grip for attaching the filter unit 140 and/or for replacing one or more filter units 140 or filters. The indents may be optional. The indents may be molded to any shape or form that functions as a grip. If the indents 143a-f are included, the number of indents may be variable. In an embodiment indents 143a-f have an oval shape. Indents 143a-f may be replaced with bumps or another manner of texturing the surface to provide a grip.

The housing cap 154 is a structure with one or more caps that are fitted on the top of each filter. Housing cap 154 is attached at the top of the filter housings 142a and 142b and holds the filter in place with respect to the housing 142a and 142b and to manifold 101.

The base 190 provides an attachment for the filter housings 142a and for the fluid filter system and will be discussed in conjunction with FIG. 1A in more detail (see also FIG. 8).

FIG. 1C shows a top view of an embodiment of the fluid filter system 100 with the manifold 101 attached. The fluid filter system 100 may include manifold 101, connector 111, key 108, outlet port 112, inlet port 122, housing cap 154, and base 190. In other embodiments, the fluid filter system 100 may not include all of the components listed and/or may include other components in addition to or instead of those listed above.

The manifold 101 is discussed in more detail with reference to FIG. 1A. In FIG. 1C, the manifold is shown connected to the filter housing via a connector which is activated by the key 108.

Connector 111 attaches the manifold 101 to the filter unit and removably attaches the manifold 101 to the rest of the filter system 100. The manifold 101 is attached above the housing cap. The method of connection is discussed in more detail in FIGS. 3-4, 12, 13-14, and 15.

Key 108, outlet port 112, inlet port 122, housing cap 154 and base 190 were discussed above with reference to FIG. 1B.

FIG. 1D shows a side view of an embodiment of a fluid filter system 100. The filter system includes manifold 101, outlet port 112, inlet port 122, filter housing 142b, indents 143a-f, housing end cap 147, base 190, and wall 192b. In other embodiments, the fluid filter system 100 may not include all of the components listed and/or may include other components in addition to or instead of those listed above.

Manifold 101, outlet port 112, inlet port 122, filter housing 142b, indents 143a-f, and base 190 were discussed in FIGS. 1A-1C.

Housing end cap 147 closes the filter housing 142a to keep fluid from exiting at the bottom of the fluid filter system 100. Housing end cap 147 may be removably or permanently attached. Housing end cap 147 may be formed to include one or more protrusions, rims or threads that allow for secure attachment to the base 190.

Wall 192b is a part of base 190 that provides support for the filter housing 142b. Wall 192b is formed perpendicular to the base 190. Wall 192b and base 190 will be discussed in more detail in conjunction with FIG. 8.

FIGS. 1E and 1F show two perspective views of an embodiment of a fluid filter system 100 from the right side (1E) and the left side (1F). Fluid filter system may include manifold 101, connector 111, key 108, outlet port 112, inlet port 122, filter housing 142a and 142b, indents 143a-f, housing end cap 147a and 147b, base 190, and wall 192a and 192b. In other embodiments, the fluid filter system 100 may not include all of the components listed and/or may include other components in addition to or instead of those listed above.

Manifold 101, connector 111, key 108, outlet port 112, inlet port 122, filter housing 142a and 142b, indents 143a-f, housing end cap 147a and 147b, base 190, and wall 192a and 192b have been discussed in FIGS. 1A-1D. However, FIGS. 1E and 1F provide a view of the attachment of the filter housings 142a and 142b into the base 190 via the housing end cap 147a and 147b.

FIGS. 2A-2G shows an embodiment of the fluid filter system 200 in which the manifold is not attached to the filter unit.

FIG. 2A shows a bottom view of an embodiment of the fluid filter system 200 without the manifold attached. The fluid filter system 200 includes a base 190. In other embodiments, the fluid filter system 200 may not include all of the components listed and/or may include other components in addition to or instead of those listed above. Fluid filter system 200 may be an embodiment of filter unit 140 in FIG. 1. Base 290 may be an embodiment of base 190, which was discussed in conjunction with FIGS. 1A-1F as base 190.

FIG. 2B shows a side view of an embodiment of a fluid filter system 200 without the manifold attached. The fluid filter system 200 includes fluid distributor 207, bar 220, outlet conduit 221a, inlet conduit 221b, filter housing 242a, indents 243a-f, filter housing end cap 247a, housing cap 254, trough 256a, base 290, and wall 292a. In other embodiments, the fluid filter system 200 may not include all of the components listed and/or may include other components in addition to or instead of those listed above.

Fluid distributor 207 is a structure that is configured to fit into the manifold of the fluid filter system 200 so that unfiltered fluid can flow into one conduit in the fluid distributor 207 via the inlet port, be distributed by channels in the fluid distributor to both filters in the fluid filter system 200, and then the filtered fluid can be pushed out through a conduit on the fluid distributor 207 via the outlet port. The top of fluid distributor 207 includes conduits and a bar. Fluid distributor 207 includes channels that distribute the fluid into each filter. Fluid distributor 207 is configured to fit into the manifold via the conduits and to fit into the housing cap. More detail is provided of the fluid distributor 207 in FIG. 5.

Bar 220 is a part of the fluid distributor 207 that is configured to allow attachment to the manifold in such a way that the key can lift the manifold off of the rest of the fluid filter system 200.

Outlet conduit 221a may be a cylindrical structure extending from the bottom surface of the fluid distributor 207. The outlet conduit 221a includes an outlet channel and an outlet opening that align with a channel in the filter unit for directing filtered fluid out of the filter unit to the outlet port 212. Outlet conduit 221a is configured to fit within the outlet port 212 and to allow movement of filtered fluid out of the fluid filter system 200.

Inlet conduit 221b may be a cylindrical structure extending from the bottom surface of the fluid distributor 207. The inlet conduit 221b includes an inlet channel and an inlet opening that align with a channel in the filter unit for directing filtered fluid into the filter unit. Inlet conduit 221b is configured to fit within the inlet port and to allow movement of unfiltered fluid into the fluid filter system 200. In other embodiments outlet conduit 221a and inlet conduit 221b may have cross sectional shapes that are not circular (e.g., outlet conduits 221a and inlet conduit 221b may have cross sectional shapes that are oval, ellipsoidal, triangular, square, rectangular, pentagonal, hexagonal, and/or of another polygon or other shape).

Trough 256a is one of two structures (256a and 256b) on housing cap that fit between a narrow part of the fluid distributor 207. Trough 256a functions to attach the manifold 201 to the housing cap. Trough 256a may have a shape of a partial cylinder or have another shape.

Embodiments of filter unit 240, filter housing 242a, indents 243a-f, housing end cap 247a, housing cap 254, base 290, and wall 292a were discussed in conjunction with FIG. 1A-1F as filter unit 140, filter housing 142a and 142b, indents 143a-f, housing end cap 147a and 147b, housing cap 154, base 190, and walls 192a and 192b.

FIG. 2C shows a front view of an embodiment of a fluid filter system. The fluid filter system 200 includes fluid distributor 207, bar 220, outlet conduit 221a, inlet conduit 221b, filter unit 240, filter housing 242a and 242b, indents 243a-f, housing end cap 247a and 247b, housing cap 254, troughs 256a and 256b, base 290, and wall 292a and 292b. In other embodiments, the fluid filter system 200 may not include all of the components listed and/or may include other components in addition to or instead of those listed above.

Embodiments of fluid distributor 207, bar 220, outlet conduit 221a, inlet conduit 221b, filter unit 240, filter housing 242a and 242b, indents 243a-f, housing end cap 247a and 247b, housing cap 254, base 290, and walls 292a and 292b were discussed in FIG. 1A-1F as filter unit 140, filter housing 142a and 142b, indents 143a-f, housing end cap 147a and 147b, housing cap 154, base 190, and walls 192a and 192b.

FIG. 2D shows a different side view of an embodiment of the fluid filter system of FIG. 1A-1G. FIG. 2D includes all of the parts of FIG. 2B except from the other side of the fluid filter system 200.

FIG. 2E shows a top view of an embodiment of a fluid filter system 200 from the perspective of someone looking down on the device. The fluid filter system 200 can include filter distributor 207, bar 220, outlet conduit 221a, inlet conduit 221b, and base 290. In other embodiments, the fluid filter system 200 may not include all of the components listed and/or may include other components in addition to or instead of those listed above.

Embodiments of filter distributor 207, bar 220, outlet conduit 221a, inlet conduit 221b, housing cap 254, and base 290 were discussed in FIGS. 1A-1F as filter distributor 107, bar 120, outlet conduit 121a, inlet conduit 121b, housing cap 154, and base 190.

FIGS. 2F and 2G show perspective views of an embodiment of a fluid filter system 200. Fluid filter system 200 may include fluid distributor 207, bar 220, outlet conduit 221a, inlet conduit 221b, filter unit 240, filter housing 242a and 242b, indents 243a-f, housing end cap 247a and 247b, housing cap 254, troughs 256a and 256b, base 290, and wall 292a and 292b. In other embodiments, the fluid filter system 200 may not include all of the components listed and/or may include other components in addition to or instead of those listed above.

The perspective views of FIGS. 2F and 2G show more detail of the fluid distributor 207. These perspectives show how the narrow section of the fluid distributor 207 (that includes the bar 220) fits between the troughs 256a and 256b on the housing caps 254. Embodiments of fluid distributor 207, bar 220, outlet conduit 221a, inlet conduit 221b, filter unit 240, filter housing 242a and 242b, indents 243a-f, housing end cap 247a and 247b, housing cap 254, base 290, and walls 292a and 292b were discussed in FIG. 1A-1F as filter unit 140, filter housing 142a and 142b, indents 143a-f, housing end cap 147a and 147b, housing cap 154, base 190, and walls 192a and 192b.

Figure 3:
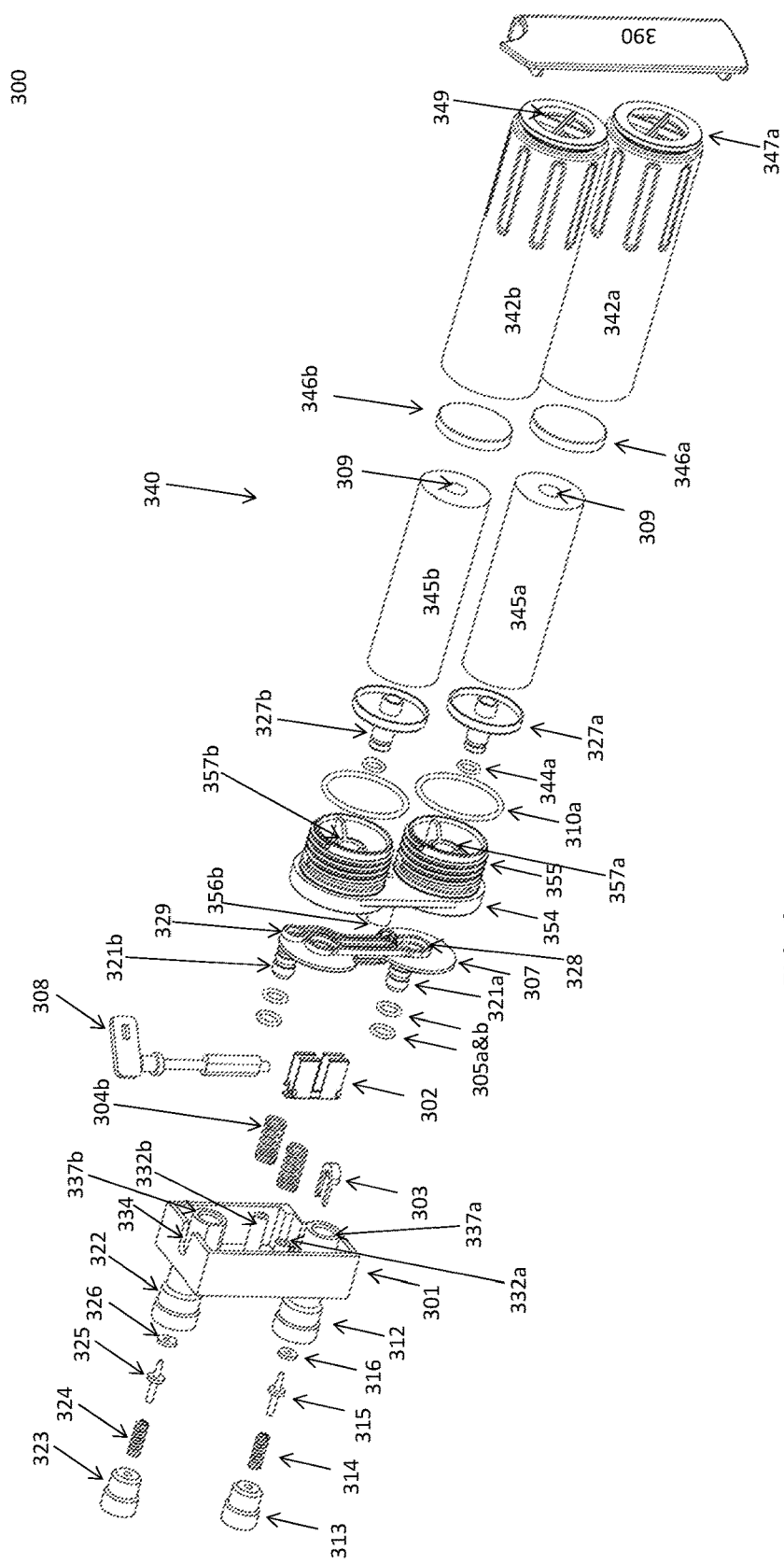
FIG. 3 shows an exploded view of an embodiment of the fluid filter system from a bottom perspective.
Figure 4:
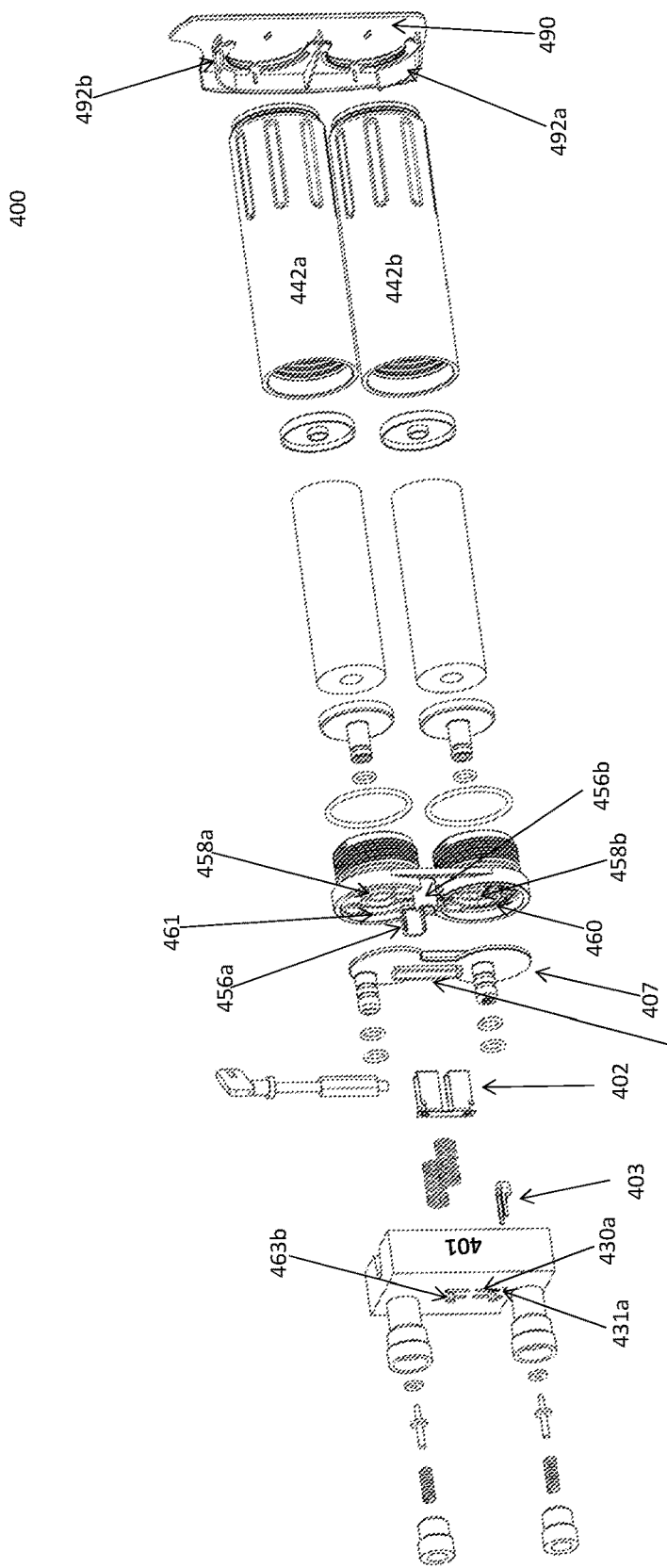
FIG. 4 shows an exploded view of an embodiment of the fluid filter system from a top perspective.

FIGS. 3 and 4 show exploded views of an embodiment of the fluid filter system 300 from a bottom perspective (FIG. 3) and a top perspective (FIG. 4). The fluid filter system 300 and 400 may include manifold 301, filter clip 302, key clip 303, manifold springs 304a and 304b, conduit o-rings 305a-d, fluid distributor 307, key 308, hollow core 309, large o-rings 310a and b, outlet port 312, outlet plug 313, outlet spring 314, outlet valve 315, outlet valve o-ring 316, bar 320, outlet conduit 321a, inlet conduit 321b, inlet port 322, inlet plug 323, inlet spring 324, inlet valve 325, inlet valve o-ring 326, filter cap 327, outlet channel 328, inlet channel 329, slots 330a-d, manifold posts 332a and b, key notch 334, manifold ports 337a and b, filter unit 340, filter housing 342a and 342b, indents 343a-f, filter cap o-ring 344, filters 345a and b, filter end caps 346a and b, housing end caps 347a and 347b, cross bars 349, housing cap 354, conduits 355a and b, troughs 356a and 356b, housing cap docks 357a and b, and base 390. In other embodiments, the fluid filter system 300 may not include all of the components listed and/or may include other components in addition to or instead of those listed above.

Fluid filter system 300 may be an embodiment of fluid filter system 100. The exploded view of the fluid filter system 300 shows details of the bottom of the components of the fluid filter system 300 and how they fit together. Since the function of the fluid filter system 300 is to input unfiltered fluid and output filtered fluid, many of the components include holes that allow for the movement of the fluid through the component. Thus, the plugs, valves, ports, manifold, fluid distributor, housing cap, and filter cap each contain two holes. The filter has a hollow portion that functions in the fluid removal. The filter end caps do not have holes, because the filter end caps function to prevent the fluids exterior to the filter element from entering the cavity within the filter without being filtered. The housing end caps do not have holes, because the housing end caps function to keep the fluids from leaking out of the bottom of the filter unit.

Embodiments of manifold 301, fluid distributor 307, key 308, filter unit 340, bar 320, filters 345a and b, and filter end caps 346a and 346b were discussed in FIG. 1A-1F as manifold 101, fluid distributor 107, key 108, filter unit 140, bar 120, filters 145a and b, and filter end caps 146a and b.

Filter clip 302 works with the key to allow the user to remove the manifold 301 from the rest of the fluid filter system 300. In an embodiment, filter clip 302 has four legs that can be shaped as rectangles or any shape as long as slots of the same shape are provided on the manifold. In another embodiment, filter clip 302 has a different number of legs and/or a different shape. The thin part of the oval sleeve on the key fits within the legs without deforming the legs. When the key 308 is turned so that the wider part of the oval sleeve is placed between the legs of the filter clip 302, the legs are deformed outward, and the manifold is released. Thus, the filter clip removably attaches the manifold 301 to the fluid filter system 300. The four flexible legs can be moved outward from the position shown in FIG. 3 (deformed). When the legs are moved outward, the manifold is released from the fluid filter system 300. This allows the user to remove the manifold to replace the filter unit 340, one or more filter housings 142a or b and/or one or more filters 145a orb (see FIG. 18 for details of the filter clip). In other embodiments, filter clip 301 may be replaced with a different clip that releases items or grabs items in response to being deformed (e.g., by the key).

Key clip 303 holds the key in place. The key clip 303 fits around the bottom of the key and hooks into two holes (see 331a and b in FIG. 3) in the manifold to hold the key in place (see FIG. 19 for details of the key clip). In other embodiments, key clip may be replaced with another clip or fastener having a different shape that holds the key in place, while allowing the key to turn or move in another way to open and close filter clip or another clip holding manifold 301 to the rest of filter system 300.

Manifold springs 304a and 304b attach to each of the manifold posts on the bottom of the manifold 301. In an embodiment, the posts are cylindrical and the springs are coil springs. In other embodiments, other types of springs are used and the posts have other shapes. Manifold springs 304a and 304b are pushed up when the housing cap is attached to the manifold. When the manifold is detached, the manifold springs push away from the cylinders, helping to detach the manifold from the rest of the fluid filter unit.

Conduit o-rings 305a-d attach to the outlet and inlet conduits on the fluid distributor to form a seal. Conduit o-rings are fitted to encircle the conduits so that fluids will not leak. In one embodiment, the conduit o-rings 305a-d are made of rubber, silicon, or any other soft and/or resilient fluid tight materials. In this specification, any part that is intended to form a seal with an o-ring or another component so that fluids will not leak may be made from a nonporous material, such as plastic or metal. Although four o-rings are shown (two for each conduit), any number of conduit o-rings 305a-d may be used as long as they result in a seal.

Fluid distributor 307 is the portion of the manifold that includes channels that are connected to the inlet port and outlet port on the manifold to distribute the fluid in and out of the fluid filter system 300. In at least one embodiment, the fluid distributor 307 includes an inlet channel that leads unfiltered fluid from the inlet conduit into the filter unit and an outlet channel that directs filtered fluid out to the outlet conduit.

Hollow core 309 is a hollow area within the filter column, which may also be referred to as the filter cavity.

Large o-rings 310a and b sit at the edge of the screw threads for the filter housings to create a seal. Large o-rings 310a and b are circular loops of elastomer fitted to the edge of the screw threads for the filter housings for providing a fluid-tight seal when the housing cap is inserted into the filter housings. The seal between the filter housings and the housing cap prevents the fluid entering or exiting the filter unit from leaking. This prevents unfiltered fluid from contaminating filtered fluid. In one embodiment, the large o-ring 310a or b is made of rubber, silicon, or any other soft and/or resilient fluid tight materials.

Outlet port 312, outlet plug 313, outlet spring 314, outlet valve 315, and outlet valve o-ring function to form a valve that allows fluids to exit the outlet port 312 but closes when the filter unit is removed from the manifold. Outlet valve 315 is a mechanically driven valve that controls access of filtered fluid through an outlet opening in the manifold 101 into the filter unit of the fluid filter system 100. In an embodiment, the outlet valve 315 is mechanically biased to close the outlet opening. When the outlet valve 315 is depressed toward the top of the manifold 101, a flow path is formed through the outlet opening, allowing filtered fluid to exit the filter unit of the fluid filter system 100.

Outlet port 312 is attached to the manifold 301 and allows filtered fluids exiting a fluid distributor to pass through the manifold to a location for use. Outlet port 312 has a hole through the middle that allows liquid to move from the bottom to the top. The plug 313, outlet spring 314, outlet valve 315 and valve o-ring 316 are inserted in outlet port 312 and function as a valve that allows fluids to exit the filter unit for use, when held open by the key.

Outlet conduit 321a is a part of the fluid distributor 307 that allows the fluid to move from the channels in the fluid distributor through the manifold and out the outlet port 312. The outlet conduit 321a attaches to a port 135a on the bottom of the manifold. In some embodiments, the outlet conduit 321a has a smaller diameter than the port 135a on the manifold. Having the outlet conduit 321a have a smaller diameter than the port 135a allows the outlet conduit 312 to fit within the port 135a, and with the help of valve o-rings hold the parts together in a sealed fashion.

Inlet conduit 321b is a part of the fluid distributor 307 and moves the fluid from the channels in the fluid distributor from the manifold through the housing cap and into one or both filters. In some embodiments, the inlet conduit 321b is smaller than the diameter of the port 135b on the manifold. Having the inlet conduit 321b have a smaller diameter than the port 135b allows the inlet conduit 312 to fit within the port 135, and with the help of o-rings holds the parts together in a sealed fashion.

Inlet port 322 includes an inlet channel that may be tubular and may be connected to a fluid source/supply for receiving a flow of unfiltered fluid. The inlet port 322 directs unfiltered fluid into the fluid distributor 307 of the manifold 101.

Inlet port 322, inlet plug 323, inlet spring 324, inlet valve 325, and inlet valve o-ring 326 form a valve that allows fluids to only enter the inlet port 322. Inlet valve 325 is a mechanically driven valve that controls access of unfiltered fluid through an inlet opening in the manifold 301 into the filter unit of the fluid filter system 300. In an embodiment, the inlet valve 325 is biased to close the inlet opening. When the valve 325 is depressed toward the top of the manifold 301, a flow path is formed through the inlet opening, allowing unfiltered fluid to enter the filter unit of the fluid filter system 300. Inlet port 322 is part of the manifold 301 and allows fluids through the manifold 301 to a fluid distributor. Inlet port 322 has a hole through the middle that allows liquid to move from the top to the bottom. The plug 323, inlet spring 324, inlet valve 325 and valve o-ring 326 function as a valve to allow fluids to enter the filter unit for use, when held open by the key.

Filter cap 327*a* and *b* has a protrusion on the top that fits within the housing cap port. Filter cap 327*a* covers the filter housing (342*a* and *b*) to allow fluids to be channeled into the filters or out of the filters. Outlet channel 328 and inlet channel 329 are channels that are formed on the bottom of the fluid distributor 307. The outlet channel 328 acts to channel fluid from the filters to the outlet port 312. Inlet channel 329 acts to channel fluid from the inlet port 322 into the filters.

Slots 330*a-d* may be rectangular holes in the middle of the manifold that attach the filter clip 302 to the manifold 301. Each leg of the clip slides into a slot. The filter clip 302 is held in the slot by a hook on the end of the leg.

Manifold posts 332*a* and *b* attach the manifold to the housing cap. In an embodiment, manifold posts 332*a* and *b* may be cylindrical or have another shape. Manifold springs 304*a* and 304*b* attach to each of the manifold posts 332*a* and *b* on the bottom of the manifold 301. Manifold springs 304*a* and 304*b* are pushed up on the posts when the manifold is attached. When the manifold 301 is released, the springs push the manifold off of the rest of the fluid filter unit to detach manifold 301 from the rest of the filter unit.

Key notch 334 is an area cut-out from the side of the manifold 301 that allows the part of the key 308 that is gripped be placed on the outside of the manifold 301, while the part of the key that opens the filter clip is inside the manifold 301.

Manifold ports 337*a* and *b* allow fluids to pass through the manifold 301. Manifold ports 337*a* and *b* attach to the inlet and outlet conduits 321*b* and *a*. Conduit o-rings are used to create a seal to keep fluids from leaking. In this specification, any part that is intended to form a seal with an o-ring or another component so that fluids will not leak may be made from a nonporous material, such as plastic or metal. Some non-limiting examples of nonporous plastics that may be used for the manifold ports 337*a* and *b* and/or other components used for creating a seal are Polyethylene Terephthalate (PET), High-Density Polyethylene (HDPE), Acrylonitrile Butadiene Styrene (ABS), Polyvinyl Chloride (PVC) or Polypropylene (PP).

Filter unit 340 includes two filter housings containing two filters. Filter unit 340 has a filter cap on top (327*a* and *b*), a filter end cap on the bottom (346*a* and *b*) and housing end caps that interact with the base 190. The filter unit 340 may be replaced. Alternatively, each of the filter housings 142*a* and *b* containing the filters may be replaced. Alternatively, the filters 145*a* and *b* may be replaced.

The filter housing 342*a* and 342*b* is attached to the housing cap 354 via the screw threads. In other words, each housing is screwed onto the housing cap. The large o-ring 310 fits within the housing 342*a* and *b* to seal the housing. The conduits attached to filter caps 327*a* and *b* fit within conduits (which may be barrels or tubular structures) on the housing cap (the housing cap may include the screw threads 355). The structures that make up the filter housing, generally, have holes that allow for ingress and egress of fluids.

Embodiments of the indents 343*a-f* are discussed with reference to FIGS. 1A-1F as indents 143*a-f*.

Filter cap o-rings 344*a* or *b* attach to the protruding conduits on the filter cap 327 to create a non-leaking seal. The protruding conduit is placed in the port on the inside of the conduits on the housing cap 354. The filter cap o-ring 344*a* and *b* is sized to fit over and/or around the protruding conduits on the filter cap 327*a* and *b*. In one embodiment, the o-ring 344*a* or *b* is made of rubber, silicon, or any other soft and/or resilient fluid tight materials.

Filter 345*a* and *b* are filters that are of a size to fit within the filter housing with a space for fluid flow on the sides and in the middle of the two filters. In an embodiment, filters 345*a* and *b* include hollow cores (e.g., 309) into which fluids, under pressure from incoming water, seep from outside filters 345*a* and *b*. Filters 345*a* and *b* filter the fluid that is pumped into the filter housing 342*a* and *b* to a location in filter unit 340 just outside of the filter 345*a* and *b*. After the fluid seeps from just outside filter 345*a* and *b*, through the walls of filter 345*a* and *b*, into the hollow core within filter 345*a* and *b*, the water from the hollow core travels, via the opening of the hollow core in the filter 345*a* and *b*, and out of the filters 345*a* and *b* into outlet conduits 321*a* and *b*. In an embodiment, filters 345*a* and *b* are cylindrical and the hollow core 309 is a cylindrical channel running through the center of the filter 345*a* and *b* concentric with filter 345*a* and *b*. In an embodiment, filter 345*a* and *b* includes an inner channel that is open on both ends, allowing more fluid to fill the hollow core and be processed by filter 345*a* and *b*. In other embodiments, filter 345*a* and *b* could have other shapes, such as rectangular square, or spherical, and/or the opening has a different shape than the rest of the hollow core. Similarly, in another embodiment, filter 345*a* and *b* may be open on only one end. In an embodiment, when filter unit 340 is assembled, the filter 345*a* and *b* is slightly compressed between the filter cap 327 and the base (or end cap) 346 of the filter unit. The compression to fully install the filter 345*a* and *b* prevents unfiltered fluid from bypassing the filter 345*a* and *b* and entering the inner channel inside the filter 345*a* and *b*.

Housing end cap 347*a* and 347*b* closes the bottom of the filter housing and stably attaches the filter housing to the base. In the embodiment shown in FIG. 3, the housing end cap 347*a* and 347*b* has a rim that fits within grooves in the base 390. The user can slide each filter housing 342*a* and *b* into each half moon form on the base 390.

Cross bars 349 on the filter housing bottom 347*a* and 347*b* are optional and may be used to provide stability and/or directionality for sliding the filter housing 342 *a* and *b* into the base 390.

Housing cap 354 is shown as a single structure with two protruding conduits (which may be shaped like barrels) having screw threads 355*a* and *b*. Housing cap 354 also includes two troughs 356*a* and *b* that function to attach the housing cap to the manifold (via the manifold posts 332*a* and *b*). The troughs 356*a* and *b* are more easily seen in FIG. 4 as troughs 456*a* and *b*.

Housing cap docks 357*a* and *b* are on the bottom of the housing cap 354 and allow filtered fluid to flow through the housing cap 354 and out of the fluid filter unit 300. Housing cap docks 357*a* and *b* are fitted to attach to filter cap 327, via a protruding conduit on the top of filter cap (371).

Housing cap holes 358a and b are holes in the housing cap that interact with the outlet channel on the fluid distributor 307. Housing cap holes 358a and b are shown in FIG. 4 as housing cap holes 458a and b. The housing cap holes 358a and b allow filtered fluid from the filters into the outlet channel on the housing cap and out the outlet port 312.

Base 390 is discussed in FIG. 4 as base 490.

FIG. 4 shows an exploded view of an embodiment of the fluid filter system from a top perspective. FIG. 4 is identical to FIG. 3 except it is shown from a top perspective, giving more details of the tops of the components and how the components fit together. For example, the top of the manifold 401 includes two protrusions 463a and b and four slots 430a-d that are used to attach the filter clip (see FIG. 13 for details of the attachment). FIG. 4 also shows how the filter clip 402 connects to the bar 420 on the fluid distributor 407 to attach the two components together. FIG. 4 shows the holes 431a and b on the manifold 401 that the key clip is inserted into to attach the key.

Troughs 456a and b were discussed above in FIG. 3 as 356a and b.

Outlet channel 460 and inlet channel 461 are shown on the housing cap 354. The outlet channel 460 and inlet channel 361 on the housing cap are produced to be larger than the outlet channel and inlet channel on the fluid distributor, so that the channels on the fluid distributor fit within the channels on the housing cap.

Base 490 is discussed in FIG. 1A in more detail. Base 490 may provide a base to allow stable but removable attachment of the filter housings 342a and b. Base 490 includes two receptacles, which each may be a partial circle shaped element that receives the filter housings 342a and b (the partial circle may be a half circle, as illustrated, may be more of a circle than a half circle or may be less of a circle than a half circle, or have an entirely different shape, for example). The receptacles also include walls 492a and b that support collars or other structures that form the receptacles. The receptacle elements may also include grooves (see 895 in FIG. 8) that fit the rim (see 736 on FIG. 7) on the housing end caps. Optional arrows may be included on the base 490 to provide directional information to the user on how to insert each filter housing into the receptacles on the base 490.

FIGS. 5A-5E show an embodiment of the filter unit of a fluid distributor system 507 for the fluid filter system. The fluid distributor system 507 acts to distribute fluid to the filters and out the outlet.

Figure 2:
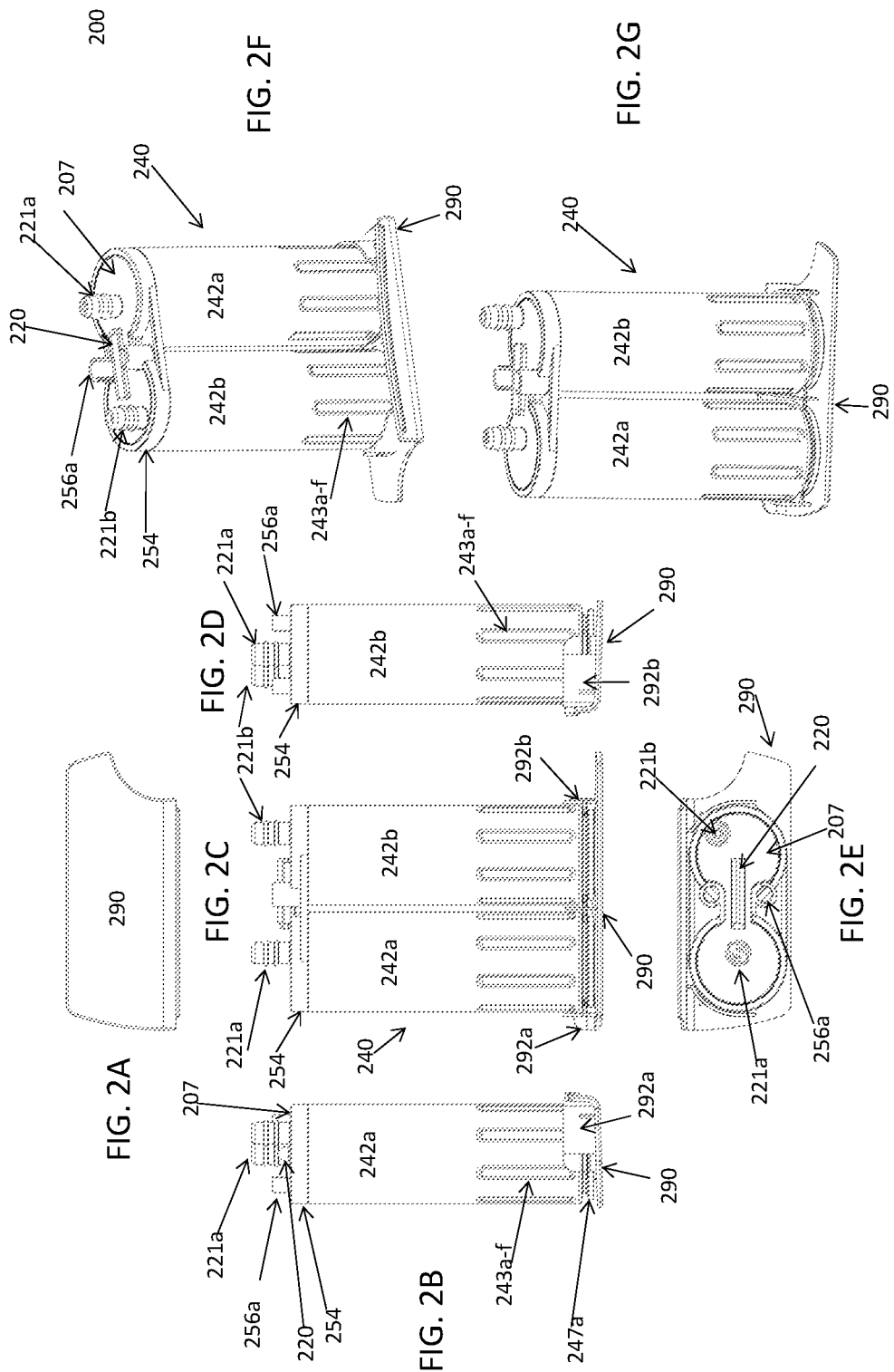
FIGS. 2A-2G show an embodiment of the fluid filter system without the manifold.

FIG. 5A shows a side view of the fluid distributor 507 (see 207 in FIG. 2, 307 in FIG. 3, and 407 in FIG. 4). The fluid distributor system 507 can include bar 520, outlet conduit 521a, inlet conduit 521b, and outlet channel 528. In other embodiments, the fluid distributor system 507 may not include all of the components listed and/or may include other components in addition to or instead of those listed above.

Bar 520 may be a rectangular structure on the fluid distributor 507 having an opening close to the surface of fluid distributor 507 (like a handle). The bar 520 functions as a fitting for the hooks on each of the legs of the filter clip. The bar 520 and the filter clip 302 hold the fluid distributor 507 to the manifold 501.

Outlet conduit 521a is a cylindrical structure extending from the bottom surface of the fluid distributor 507. The outlet conduit 521a includes an outlet opening that aligns with a channel in the filter unit for directing filtered fluid out of the filter unit to the outlet port (see 312 in FIG. 3). The hole in the outlet conduit 521a can be closed by the o-ring in the valve in the outlet port (see 312 in FIG. 3). In this specification, any part that is intended to form a seal with an o-ring or another component so that fluids will not leak may be made from a nonporous material, such as plastic or metal. Some nonlimiting examples of nonporous plastics that may be used for the outlet conduit 521a and/or other components used for creating a seal are Polyethylene Terephthalate (PET), High-Density Polyethylene (HDPE), Acrylonitrile Butadiene Styrene (ABS), Polyvinyl Chloride (PVC) or Polypropylene (PP).

Inlet conduit 521b is a cylindrical structure extending from the bottom surface of the fluid distributor 507. The inlet conduit 521b includes an inlet opening that aligns with a channel in the filter unit for directing filtered fluid from the inlet port (see 322 in FIG. 3) into the filter unit. The hole in the inlet conduit 521b can be closed by an o-ring in the valve in the inlet port (see 322 in FIG. 3). To form a seal with an o-ring or another component so that fluids will not leak, inlet conduit 521b may be made from a nonporous material, such as plastic or metal (such as those discussed above with reference to outlet conduit 521a.

Outlet channel 528 is a channel that is created by a lip on the fluid distributor 507 to direct filtered fluid into the outlet conduit 521a and out the outlet port 512. Outlet channel 528 may be of any shape that directs fluid into the conduit, but, as shown in FIG. 5, outlet channel has two rounded ends and a longer thinner channel between the two rounded ends.

FIG. 5B shows a top view of the fluid distributor system 507. Fluid distributor system 507 can include bar 520, outlet conduit crossbar 519, outlet conduit 521a, inlet conduit 521b, outlet opening 522a, and inlet opening 522b. In other embodiments, the fluid distributor 507 may not include all of the components listed and/or may include other components in addition to or instead of those listed above. The top view shows more detail of the outlet opening 522a with crossbars.

Embodiments of bar 520, outlet conduit 521a, inlet conduit 521b, and outlet channel 528 are discussed in FIG. 5A.

Outlet conduit crossbar 519 may be a bar shaped structure on the outlet conduit 521a that allows fluid to pass, pushes the outlet valve open when the filter unit is connected to the manifold and continues to hold the outlet valve open until the filter unit is disconnected from the manifold. Outlet conduit crossbar 519 may have a shape as shown in FIGS. 5B and 5D of a bar with a circular center. However, outlet conduit crossbar may have any shape that allows fluid to pass, while supporting the outlet valve—pushing and keeping the outlet valve open when the filter unit is connected to the manifold.

Outlet opening 522a is an opening through which the filtered fluid in the filter unit enters the outlet channel of the outlet conduit 521a. In an embodiment, the filtered fluid in the filter unit runs through the outlet opening 522a into the outlet channel in the outlet conduit 521a and then out of the outlet port 512.

Inlet opening 522b is an opening through which the unfiltered fluid enters the inlet conduit 521a. In an embodiment, the unfiltered fluid runs through the inlet opening 522b into the inlet channel in the fluid distributor 507 and then into the filter(s) 545a and b.

Inlet channel 529 is a channel that is created by a lip on the fluid distributor 507 to direct unfiltered fluid from the inlet conduit 521b and into the filter unit. Inlet channel may be of any shape that directs fluid into the filter, but, as shown in FIG. 5, inlet channel has two rounded ends and a longer thinner channel between.

FIG. 5C shows a side view of the fluid distributor system 507. FIG. 5C is identical to FIG. 5A except that the inlet channel 529 is shown on the bottom of the fluid distributor system rather than the outlet channel 528.

FIG. 5D shows a top perspective view of the fluid distributor 507. FIG. 5D shows more detail of the bar 520. While the bar 520 is shown having a hexagonal shape, the bar 520 can be any shape that can fit the clips of the filter clip 302 to attach the fluid distributor 507 to the manifold 501.

FIG. 5E shows a bottom perspective view of the fluid distributor. FIG. 5E shows more detail of the inlet channel 529 and outlet channel 528. The shape of the inlet channel 529 includes two rounded portions and a longer portion. One of the rounded portions encircles the inlet conduit 521b allowing liquid to move from the conduit into the channel (to be distributed into the filters).

The shape of the outlet channel 528 includes two rounded portions and a longer portion. One of the rounded portions encircles the outlet conduit 521a allowing liquid to move from the channel into the outlet conduit (to be distributed out of the fluid filter system).

FIGS. 6A-6H show an embodiment of a housing cap 654 for the filter unit 140, 240. Housing cap 654 may be an embodiment of housing cap 154 (in FIG. 1), 254 in FIG. 2, and 354 in FIG. 3.

FIG. 6A shows a bottom view of the housing cap 654. The bottom of the housing cap 654 may include conduits with screw threads 655a and b (for example), housing cap docks 657a and b, housing cap outlet ports 658a and b and injection ports 668a and b. In other embodiments, the bottom of the housing cap 654 may not include all of the components listed and/or may include other components in addition to or instead of those listed above.

The housing cap 654 is a single structure having one or more conduits (which may have a barrel shape or another shape) that are fitted on the top of each filter housing to act as caps for the filter housings (see 342a and b in FIG. 3). The conduits on the housing cap 654 may include fasteners, such as screw threads 655a and b, that allow for stable, but removable attachment of housing cap 654 to the filter housings (see 142a and b in FIGS. 1B, D, E and F). The housing cap is attached at the top of the filter housings and holds the filter in place in the housing (see 154 in FIGS. 11B, D, E and F). The housing cap functions to distribute the unfiltered fluid from the inlet channel in the fluid distributor to the filters. The housing cap also functions to distribute the filtered fluid from the filters into the outlet channel on the fluid distributor.

Conduits 655a and b each act as a cap for the respective filter housing (142a and b). The conduits are of a size that fit into the filter housings. The conduits may have screw threads (or another one or more fastener) which mate with the screw (or another one or more fastener) on the filter housings. Using the fasteners on the conduits, the filter housings can be attached to the housing cap 654. Typically, one or more o-rings can be used to insure a tight seal (see large o-rings 310 on FIG. 3). In some embodiments, the attachment between the housing and the housing cap may not be a screw attachment, but may be an alternate attachment.

The housing cap docks 657a and b may be cylinders that are shorter than the conduits 655a and b with a hole that acts as a fluid outlet port (see 658a and b). The filter caps on the filters may be inserted into the housing cap docks 657a and b. Thus, the filter caps have a conduit (see 371 on FIG. 3) that fits within the housing cap docks 657a and b. When o-rings are used (see 344 in FIG. 3), the o-rings facilitate a tight seal. Since the filter caps also have holes in the conduits, fluid can exit the filters through the filter caps and the housing cap.

The housing cap holes 658a and b are positioned within the housing cap docks 657a and b to allow the flow of fluid out of the filters (through the filter caps) and into the outlet channels on the housing cap (see 660).

Injection ports 668a and b are two holes in the inside of the conduits that act as injection ports for injecting unfiltered fluid into the filters. The unfiltered fluid from the inlet channel of the fluid distributor goes through the inlet channel of the housing port and through the injection ports into the filter.

FIGS. 6B, 6C, and 6D show two side views and a front view of the housing cap 654. The housing cap 654 can include conduits 655a and b, and troughs 656a and b. In other embodiments, the housing cap 654 may not include all of the components listed and/or may include other components in addition to or instead of those listed above.

Conduits 655a and b may be two cylinders (e.g., barrels) that may have screw threads that are configured to fit onto appropriate screw threads within the filter housings to create a cap for the filter housings. Thus, because the conduits 655a and b are held stationary on the housing cap 654, the filter housings are screwed onto the housing cap 654. The attachment of the conduits 655a and b and the filter housings is sealed using an o-ring (see large o-ring 610 in FIG. 6). FIG. 6B shows the placement of the two conduits 655a and b.

Troughs 656a and b are two protrusions that may be shaped as partial cylinders (or may have other shapes) that act as attachments for appropriate protrusions on the manifold (e.g., posts) (see 107 in FIGS. 1B, D, E, and F). Thus, the troughs 656a and b are shaped to allow the insertion of the conduits (132a and b in FIGS. 1B, D, E, and F) on the manifold 301. FIG. 6B is a right side view showing the placement of the troughs. FIG. 6D is a left side view showing the other side of housing cap 654.

FIGS. 6E, 6F, and 6G show a top view, a top perspective view, and another top perspective view from the other side of the housing cap 654. The housing cap 654 can include spokes 652, conduits 655a and b, troughs 656a and b, housing cap holes 658a-d, outlet channel 660, inlet channel 661, and injection ports 668a and b. In other embodiments, the housing cap 654 may not include all of the components listed and/or may include other components in addition to or instead of those listed above.

The spokes 652 that sit in a circular manner around the channels and within the conduits function to stabilize the channels within the housing cap 654. Spokes 652 are shown as rectangular shapes radiating outward in a circular direction from the channels to the edges of the conduits 655a and b. However, spokes 652 can be any shape and of any number to provide stability.

Conduits 655a and b, troughs 656a and b, housing cap holes 658a and b, and injection ports 668a and b were discussed above in FIGS. 6A-6D.

Outlet channel 660 is a channel that is associated with both holes 658a and b on the housing cap. Outlet channel distributes fluid out through the housing cap holes 658a and b (from the filters) out of the filter system (via the outlet ports). When the housing cap 654 is attached to the fluid distributor (see 107 in FIGS. 1B and 1D), the outlet channels on the fluid distributor interact with the outlet channels on the housing cap 654. In some embodiments, the outlet channel 660 on the housing cap 654 fit around the outlet channel on the fluid distributor.

Inlet channel 661 contains the injection ports 668a and b and receives the unfiltered fluid from the inlet channel 661 in the fluid distributor. Inlet channel 661 then distributes the unfiltered fluid to the filters, via the injection ports 668a and b. When the housing cap 654 is attached to the fluid distributor (see 107 in FIGS. 1B and 1D), the inlet channel 661 on the fluid distributor interacts with the inlet channel 661 on the housing cap 654. In some embodiments, the inlet channel 661 on the housing cap 661 fits around the inlet channel 661 on the fluid distributor (see 522b in FIG. 5).

FIG. 6H shows a bottom perspective view of the housing cap 654. The housing cap 654 can include conduits 655a and b, housing cap docks 657a and b, housing cap holes 658a and b and injection ports 668a and b. In other embodiments, the housing cap 654 may not include all of the components listed and/or may include other components in addition to or instead of those listed above.

Conduits 655a and b, housing cap docks 657a and b, and housing cap holes 658a and b, and injection ports 668a and b are discussed in FIGS. 6A-6G.

FIGS. 7A-7D show an embodiment of a filter housing 742a for the filter unit in the fluid filter system (see 100 in FIG. 1). Filter housing 742a may be an embodiment of filter housing 142a, 242a, or 342a.

FIG. 7A shows a filter housing 742a from the top view. The filter housing 742a can include filter housing cap 747a, and threads 741. In other embodiments, the filter housing 742a may not include all of the components listed and/or may include other components in addition to or instead of those listed above. While the filter housing shown in FIG. 7A-7D is numbered as 742a, it could also be 742b since the two filter housings are constructed to be the same.

Filter housing cap 747a is a cap that attaches to the bottom end of the filter housing 742a to close the cylinder and to allow attachment to the base. Filter housing cap 747a may be a circular cap containing threads 741 on the outside of the cap 747 that can be screwed into threads on the inside of the bottom of the filter housing 742a. The filter housing cap 747 may have other shapes and may have a different fastener other than screw threads.

Threads 741 are the threads (or other fastener) on the inside of the top of the filter housing 742a that attach to the conduit of the housing cap (see 354 in FIG. 3).

FIG. 7B shows a filter housing 742a from the side view. The filter housing 742a can include end cap rim 736, indents 743a-f, and filter housing cap 747a. In other embodiments, the filter housing 742a may not include all of the components listed and/or may include other components in addition to or instead of those listed above.

End cap rim 736 is a rim on the side of the filter housing end cap 747 that functions to insert and hold the filter housings 742 a and b into the base of the fluid filter system 700. End cap rim 736 fits into the grooves (see 995 in FIG. 9) in the base (see 990 in FIG. 9). The end cap rim 736 keeps the filter housings 742a and b stably but removably in the base.

Indents 743a-f are protrusions on each housing 742a that provide a grip for removing each housing 742a from a base. The indents 743a-f may also function as a grip for attaching the filter unit to a fluid source and/or for replacing one or more filter units or filters within the filter housing(s). The indents may be optional. The indents may be molded in any shape or form that functions as a grip. If the indents 743a-f are included, the number of indents may be variable.

Filter housing cap 747a is shown attached to the bottom of the filter housing 742a. The filter housing cap does not attach flush to the bottom of the filter housing. A gap is left between the end cap and the filter housing (the end cap rim 736). This gap is the end cap rim 736 and fits into the base.

FIG. 7C shows a filter housing 742a from the bottom view. The filter housing can include filter housing cap 747a, arrows 748, and cross bars 749. In other embodiments, the filter housing 742a may not include all of the components listed and/or may include other components in addition to or instead of those listed above. This view shows the filter housing cap 747a from the bottom view. The bottom of the filter housing cap 747a will be set onto the base. As discussed in FIG. 7B, the filter housing cap 747a slides into receptacles (e.g., having a partial circular form on the base to provide stable attachment.

One or more arrows 748a and b can be placed on the outside of each filter housing cap 747a (or b) for directional attachment of each filter housing into the base. Arrows can also be included on the base to match with the arrows on the filter housing cap 747a, indicating how to insert the filter housing 742a into base 390 (FIG. 3). The arrows 448a and b are optional.

Optionally, one or more cross bars 749a-h are placed on the outside of each filter housing cap 747a that may strengthen the filter housing cap 747a.

FIG. 7D shows a filter housing 742a from a perspective view. The filter housing 742a may include end cap rim 736, indents 743a-f, filter housing cap 747a, and threads 741. In other embodiments, the filter housing 742a may not include all of the components listed and/or may include other components in addition to or instead of those listed above. FIG. 7D shows all of the same components as FIG. 7B, except, the threads 741 on the inside top of the filter housing 742a are shown in the perspective view. These threads 741 function to allow attachment of the housing cap (see 354 in FIG. 3).

FIGS. 8A-8F show an embodiment of the base 890 of the fluid filter system. The base 890 may be a flat, approximately rectangular shaped component that holds the two filter units together as one structure. The base includes receptacles, which may have a partial circle shape that provide a stable support for each filter housing. The receptacle elements also include walls that help keep the two filter housings in alignment with one another. The receptacles may also include grooves that fit the rim on the housing end caps. The filter housings are inserted into the receptacles in the base. Typically, the filter housings are inserted as a filter unit. Base 890 may be an embodiment of base 190 in FIG. 1, base 290 in FIG. 2, base 390 in FIG. 3, and base 490 in FIG. 4, for example.

FIG. 8A shows a bottom view of the base 890. The bottom of the base 890 includes curve 897 and back wall 898. In other embodiments, the base 890 may not include all of the components listed and/or may include other components in addition to or instead of those listed above.

The curve 897 is formed on the side of the base. The curve 897 is a cut out part of the bottom and back of the base 800. The curve may provide stability. In the embodiment shown herein, the curve is provided below the key on the fluid filter system 800.

The back wall 898 is a structure on the back of the base 890 that is perpendicular to the base. The back wall 898 enhances the rigidity and strength of base 890, so that base 890 is less likely to break and provides a structure that supports the receptacles for the bases of the filter units (or filter cartridges). The back wall 898 can be formed with the base 890 or can be added after formation of the base 890. The height of the back wall 898 is variable and can be any height that provides a bit more stability. The back wall 898 may also include a protruding portion that may function as a grip to help the user manipulate base 890 in addition to strengthening back wall 898. Back wall 898 may be optional.

FIG. 8B shows a perspective bottom view of the base 890. The base 890 includes wall 892b, curve 897, and back wall 898. In other embodiments, the base 890 may not include all of the components listed and/or may include other components in addition to or instead of those listed above.

Wall 892b is one of the perpendicular walls 892a and b that support the collars (see FIG. 8, 893a-d) that form the receptacles into which the bases of the filter units are inserted. The walls 892a and 892b are on the outside portions of the outer collars (893a and 893d). The height of the walls is variable. The walls 892a and b may be optional.

Curve 897 and back wall 898 were discussed above in FIG. 8A.

FIG. 8C shows a front view of the base 890. The base 890 includes walls 892a and b, collars 893a-d, grooves 895a-d, central wall 896, curve 897, and back wall 898. In other embodiments, the base 890 may not include all of the components listed and/or may include other components in addition to or instead of those listed above. FIG. 8C also shows a variety of components that are optional including a notch between the collars, a notch between the grooves, and a space bar on the back wall in the middle of the notch.

The walls 892a and b, curve 897 and back wall 898 were discussed in FIGS. 8A and 8B.

The collars 893a-d work together to create the receptacles on the base. The collars 893a-d may be contoured portions on the base that that have a shape that mates with the base of the filter housings. For example, the filter housing may have a base with a circular shape and collars 893a-d may have a circular contour (alternatively, the base of filter units may be square, rectangular, hexagonal or have another shape and collars 893a-d may form a complimentary shape that mates with the base of the filter units). One outer collar (893a and d) and one inner collar (893b and c) work together to create a single receptacle collar (which may be a partial circle) that fits the filter housing. The collars may be produced as shown having two collar sections for each filter housing; there may be an outer left collar 893a, an inner left collar 893b, an inner right collar 893c and an outer right collar 893d. Alternatively, the collars can be produced as a single piece (e.g. as partial circles) or there may be more than just two collar sections for each receptacle. The collars include raised portions that reinforce the collar and/or help hold the filter units on the collar. The collars also include grooves that allow insertion of the filter housings.

The grooves 895a-d are produced by the distance between the collars 893a-d and the surface of the base 890, which produces a space for insertion of the rim (see 736 in FIG. 7B) of the housing end caps (see 747a or b in FIG. 7B). The grooves 895a-d are positioned to be the distance above the bottom of the housing end cap to fit the height of the rim where (see 736 in FIG. 7B). The filter housing can be slid into or snapped into the collars 893a-d via the grooves 895a-d by sliding the rim of the end cap of the filter housings into each set of two collars 893a-d on the base, and the friction created by the raised portions may aid in keeping the filter housings in place.

The central wall 896 is a perpendicular back wall 898 and supports the collars 893a-b, and makes base 890 sturdier and more rigid. The central wall 896 is provided between the two inner collars (893b and 893c). The central wall 896 may be the same height as the outer walls (892a and b) or may be of a different height. Although some structure is necessary to support collars 893a-d, one or more of back wall, central wall 896, outer walls 892a and b may be left out and/or replaced by other structures, such as posts between collars 892a-d and base 890.

FIG. 8D shows a side view of the base 890 from the right side. The base 890 includes wall 192b, and collar 193d. In other embodiments, the base 890 may not include all of the components listed and/or may include other components in addition to or instead of those listed above. The walls 192a-d and collars 193a-d were discussed in FIG. 8B.

FIG. 8E shows a top view of the base 890. The base 890 includes walls 892a and b, collars 893a-d, raised portions 894a-d, central wall 896, curve 897, and back wall 898. In other embodiments, the base 890 may not include all of the components listed and/or may include other components in addition to or instead of those listed above. FIG. 8E shows the components of FIG. 8C from above and the raised portions 894a-d on the collars.

The raised portions 894a-d are raised areas on the top of the collars 893a-d that function to help keep the filter housings in place when the housing end caps are inserted into the collars 893a-d. Raised portions 894a-d are optional.

FIG. 8F shows a perspective top view of the base 890. The base 890 includes walls 892a and b, collars 893a-d, raised portions 894a-d, grooves 895-d, central wall 896, curve 897, back wall 898 and tab 899. In other embodiments, the base 890 may not include all of the components listed and/or may include other components in addition to or instead of those listed above. FIG. 8E shows the components of FIG. 8C from above, but FIG. 8E also provides a view of the tab 899.

The tabs 899 are end portions of collars 893a and d that are not supported by walls 892 a and b, which are produced by a cut-out on the side of the side walls 192a and 192b that allow the tab 199 produced to flex slightly and make it easier to insert the filter housings.

FIGS. 9A-9E show an embodiment of the filter cap 927 of the fluid filter system 900. Filter cap 927 may be an embodiment of filter cap 327 in FIGS. 3 and 4.

FIG. 9A shows a bottom view of the filter cap 927. The filter cap 927 can include filter cap rim 970, filter cap connector 973, and filter cap hole 974. In other embodiments, the filter cap 927 may not include all of the components listed and/or may include other components in addition to or instead of those listed above.

The filter cap 927 is a circular element with a projection having a hole in it that allows fluid through. A filter cap 927a and 927b sits on top of each filter (see 345a and 345b in FIG. 3). The filter cap attaches to the filter on one end and to a port within the housing cap on the other end. The fluid may move into the filters through one filter cap (927b) or out of the filters through the other filter cap (927a).

The filter cap rim 970 is a lip on the perimeter of the filter cap 927 that allows attachment of the filter cap to the filter. The filter cap rim 970 may fit snugly around the filter to help prevent unfiltered fluids from bypassing the filter element.

The filter cap connector 973 is a conduit that projects from the bottom of the filter cap 927 that connects the filter cap to the filter. The filter cap connector 973 may be cylindrical and fits within the hollow core of the filter (the hollow core and the filter cap connector may have other shapes). The filter cap connector 973 and the filter cap rim 970 work together to fit around the filter and connect the filter to the housing cap and prevent unfiltered fluids from bypassing the filter element.

The filter cap hole 974 is an opening at the end of a conduit (which may be formed in part by filter cap connector 973) for fluid into or out of the filter. The filter cap hole 974 is a hole at the end of the filter cap conduit and the filter cap connector.

FIG. 9B shows a side view of the filter cap 927. The filter cap 927 may include filter cap rim 970, filter cap conduit 971, filter cap groove 972, and filter cap connector 973. In other embodiments, the filter cap 927 may not include all of the components listed and/or may include other components in addition to or instead of those listed above.

Filter cap rim 970, filter cap connector 973, and filter cap hole 974 were discussed in FIG. 9A.

Filter cap conduit 971 is a projection on the top of the filter cap that includes a groove 972. Filter cap conduit 971 is a conduit for fluids leaving the filter (which may be part of the same conduit formed by filter cap connector 973). The filter cap conduit 971 is produced to fit within the housing cap port on the housing cap. Filter cap hole 974 is located at one end of filter cap conduit 971. Thus, the filter cap conduit 971 has a diameter that is smaller than the diameter of the housing cap dock (see 657 in FIG. 6).

Filter cap groove 972 is a groove on the filter cap conduit 971 that holds o-ring 344 *a* or *b* (FIG. 3A).

FIG. 9C shows a top perspective view of the filter cap 927. The filter cap 927 can include filter cap rim 970, filter cap conduit 971, filter cap groove 972, and filter cap hole 974. In other embodiments, the filter cap 927 may not include all of the components listed and/or may include other components in addition to or instead of those listed above.

Filter cap rim 970, filter cap connector 973, and filter cap hole 974 were discussed in FIG. 9A. Filter cap groove 972, and Filter cap conduit 971 were discussed in FIG. 9B. However, FIG. 9C provides a good view of the filter cap hole 974 with the filter cap o-ring 944 surrounding the filter cap conduit 971.

FIG. 9D shows a top view of the filter cap 927. The filter cap 927 can include filter cap rim 970, filter cap conduit 971, and filter cap hole 974. In other embodiments, the filter cap 927 may not include all of the components listed and/or may include other components in addition to or instead of those listed above.

Filter cap rim 970, filter cap connector 973, and filter cap hole 974 were discussed in FIG. 9A. Filter cap conduit 971 was discussed in FIG. 9B.

FIG. 9E shows a bottom perspective view of the filter cap 927. The filter cap 927 can include filter cap rim 970, filter cap conduit 971, filter cap groove 972, filter cap connector 973, and filter cap hole 974. In other embodiments, the filter cap 927 may not include all of the components listed and/or may include other components in addition to or instead of those listed above.

Filter cap rim 970, filter cap connector 973, and filter cap hole 974 were discussed in FIG. 9A. Filter cap groove 972, and Filter cap conduit 971 were discussed in FIG. 9B.

FIGS. 10A-10D show a variety of views of an embodiment of the filter end cap 1046 of the fluid filter system 1000. Filter end cap 1046 may be an embodiment of filter end cap 346 in FIGS. 3 and 4.

FIG. 10A shows a front view of the filter end cap 1046, FIG. 10B shows a top view, FIG. 10C shows a perspective view from the top and FIG. 10D shows a perspective view from the bottom. The filter end cap 1046 includes a central connector 1064 and a filter end cap rim 1065. In other embodiments, the filter end cap 1046 may not include all of the components listed and/or may include other components in addition to or instead of those listed above.

Filter end cap 1046 holds the filter in place in the filter housing. Filter end cap 1046 is shown in FIG. 3 as filter end cap 346*a* or 346 *b*. Filter end cap does not have a hole in it. Filter end cap may be constructed to fit snugly on the filter with a rim around the outside of the filter and may have a central connector that fits within the hollow core of the filter.

Central connector 1064 is an optional part of the filter end cap 1046 that is configured to fit within the central core of the filter (see 345*a* and *b* in FIG. 3). The central connector 1064 helps in holding the filter end cap 1046 tightly on the filter.

Filter end cap rim 1065 may be a perpendicular wall around the perimeter of the filter end cap 1046 that fits around the outside of the filter and holds the filter end cap onto the filter, which also helps hold the filter end cap in place. Although some sort of structure is desirable for holding the filter end cap 1065 to the filter, filter end cap rim is optional 1065. Another structure could be used instead, or enough pressure could be applied by end cap 747*a* or *b* to hold filter end cap 1065 in place.

Figure 11B:
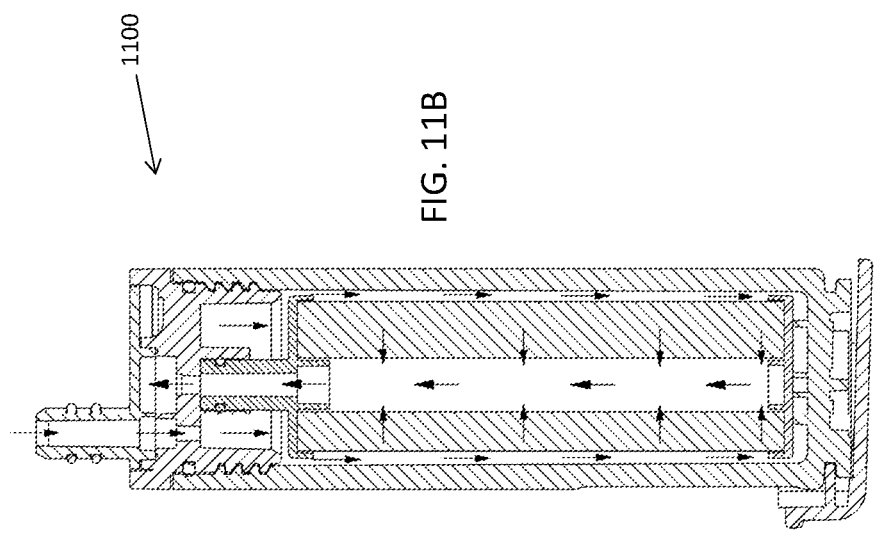
FIGS. 11A and 11B show an embodiment of the fluid flow for the fluid filter system without the manifold attached.
Figure 11A:
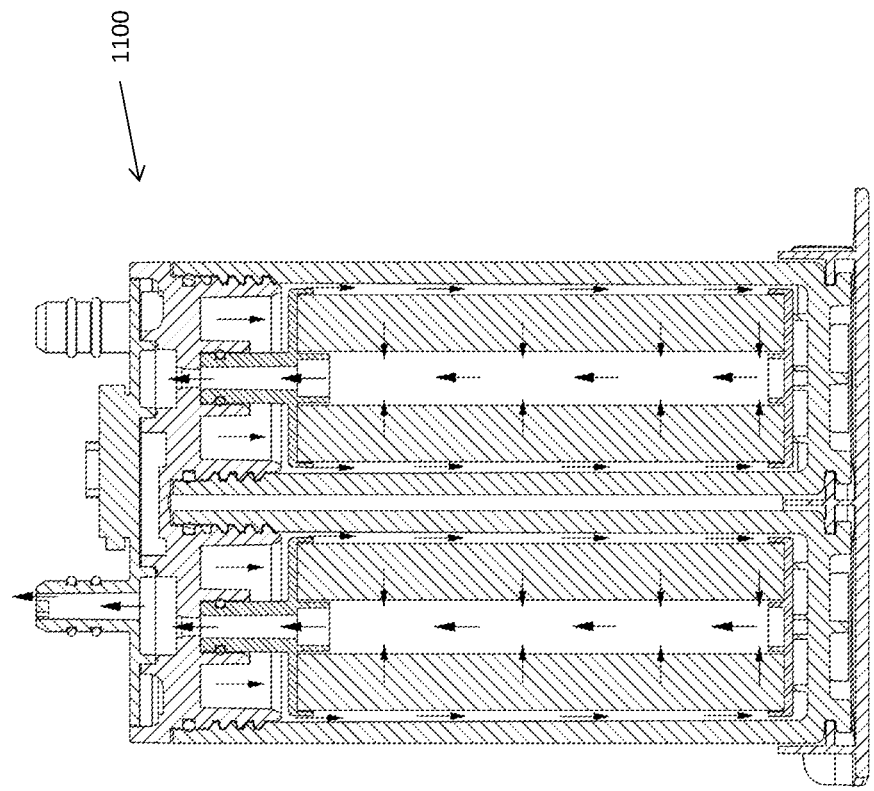

FIGS. 11A and 11B show a cross sectional view of an embodiment of the fluid flow for the fluid filter system 1100 without the manifold attached. FIG. 11A shows a cross-sectional front view of the fluid flow. The fluid filter system 1100 may be an embodiment of the fluid filter systems shown in FIGS. 1A-1F, 2A-2F, 3, and 4, as 100, 200, 300, and 400 respectively. The cutline along which the cross section is taken runs through the centers of the two filter cores. The arrows provide the direction of the flow. In FIG. 11A, the fluid enters the fluid filter system 1100 through the inlet conduit on the fluid distributor (307 in FIG. 3), the fluid is channeled by the fluid distributor into the filters via the four channels outside of the filter (345 in FIG. 3). Each filter includes a hollow core into which fluids, under pressure from incoming water, seep from outside filter. Each filter filters the fluid that is pumped into the filter housing (342*a* and *b* in FIG. 3) to a location in filter unit (340 in FIG. 3) just outside of the filter. After the fluid seeps from just outside filter, through the walls of filter, into the hollow core within the filter (309 in FIG. 3), the water from the hollow core travels, via the opening of the hollow core in the filter, and out of the filter into outlet conduit (321*a* and *b* in FIG. 3). In an embodiment, the filter element is cylindrical having a hollow core, and the hollow core is a cylindrical channel running through the center of the filter concentric with filter. In an embodiment, filter includes an inner channel that is open on both ends, allowing more fluid to fill the hollow core and be processed by filter. In other embodiments, filter could have other shapes, such as rectangular square, or may be spherical, and/or the opening may have a different shape than the rest of the hollow core. Similarly, in another embodiment, the filter may be open on only one end. In an embodiment, when filter unit is assembled, the filter is slightly compressed between the filter cap (327 in FIG. 3) and the base (or end cap) of filter unit. The compression to fully install the filter prevents unfiltered fluid from bypassing the filter and entering the inner channel inside the filter.

FIG. 11B shows a cross-section side view of the fluid flow. The cross-section view shows that the fluid flows on all sides of the filter and then through the filter to the hollow cores. The cutline along which the cross section is taken runs through one of the injection ports (e.g., 668*a* or*b*) and one of the output ports (e.g., 658*a* or *b*, respectively, see FIG. 6A). The cutline of FIG. 11B makes a 45 degree angle with the cutline of FIG. 11A.

FIGS. 12A and 12B show cross-sectional views of an embodiment of the fluid filter system 1200 with the manifold attached. FIG. 12 shows the inner workings of the valves when the manifold is attached. There is a bar (the body of the valve) that pushes up on the valve. When the valve is pushed up, the springs of the valve close up the holes in the plugs and/or conduits keeping liquid from moving past the valve. When the valve is pushed against the outlet or inlet conduit, the hole is closed. In some embodiments, the conduit also contains a crossbeam (see FIG. 5B, 519). Fluid filter system 1200 may be an embodiment of fluid filter system 100 in FIG. 1, 200 in FIG. 2, 300 in FIG. 3, 400 in FIG. 4, and 1100 in FIG. 11.

FIG. 12A is a front cross-section of the fluid filter system. The fluid filter system may include manifold 1201, inlet port 1222, outlet port 1212, filter unit 1240, and filters 1245a and 1245b. In other embodiments, fluid filter system 1200 may not include all of the components listed and/or may include other components in addition to or instead of those listed above.

Outlet port 1212, outlet plug 1213, outlet spring 1214, outlet valve 1215, and outlet valve o-ring function to form a valve that allows fluids to only exit the outlet port 1212, when the manifold 1201 is connected to the rest of the filter system. The valve mechanism is mechanically driven and controls access of filtered fluid through an outlet opening in the manifold 1201 into the filter unit of the fluid filter system 1200. In an embodiment, the valve 1215 is biased, by the outlet spring 1214 attached to outlet valve 1215 to close the outlet opening. When the valve 1212 is depressed toward the top of the manifold 1201 (e.g., by a bar crossing the outlet conduit 521a, see FIGS. 5B and 5D), a flow path is formed through the outlet opening in outlet port 1212, allowing unfiltered fluid to enter the filter unit of the fluid filter system 1200.

Inlet port 1222, inlet plug 1223, inlet spring 1224, inlet valve 1225, and inlet valve o-ring function to form a valve that allows fluids to only enter the inlet port 1222. Valve 1225 is a mechanically driven valve that controls access of unfiltered fluid through an inlet opening in the manifold 1201 into the filter unit of the fluid filter system 1200. In an embodiment, the valve 1225 is biased, by inlet spring 1224, to close the inlet opening in the inlet conduit 1221b. When the valve 1225 is depressed toward the top of the manifold 1201 (e.g., by a rim of inlet conduit 521b, see FIGS. 5B and 5D), a flow path is formed through the inlet opening in inlet port 1222, allowing unfiltered fluid to enter the filter unit of the fluid filter system 1200. Inlet port 1222 is part of the manifold 1201 and allows fluids through the manifold 1201 to a fluid distributor. Inlet port 1222 has a hole through the middle that allows liquid to move from the top to the bottom.

FIG. 12B is a side cross-section. FIG. 12B shows the same as FIG. 12A except that FIG. 12B shows the cylinder and spring which are not involved in the valve mechanism, but are involved in the manifold attachment mechanism.

Figure 13:
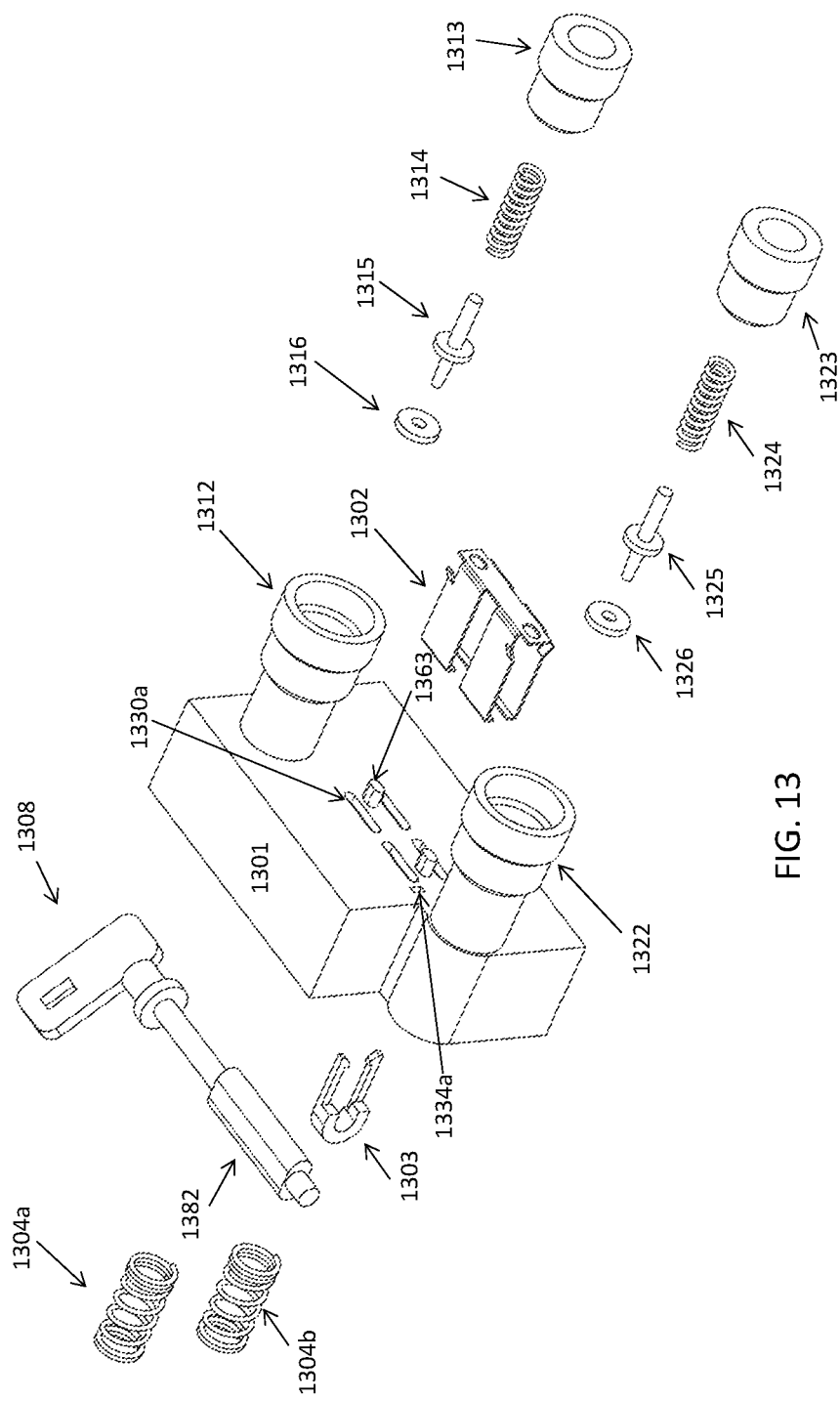
FIG. 13 shows an exploded view of an embodiment of a manifold for the fluid filter system from the top.

FIG. 13 shows a top exploded view of an embodiment of a manifold 1301 for the fluid filter system 1300. The manifold 1301 may include filter clip 1302, key clip 1303, manifold springs 1304a and b, key 1308, outlet plug 1313, outlet spring 1314, outlet valve 1315, outlet valve o-ring 1316, outlet port 1312, inlet plug 1323, inlet spring 1324, inlet valve 1325, inlet valve o-ring 1326, inlet port 1322, key clip holes 1331a and b, filter clip slots 1330a-d, and posts 1363a and b. In other embodiments, manifold 1301 may not include all of the components listed and/or may include other components in addition to or instead of those listed above.

The manifold 1301, filter clip 1302, key clip 1303, manifold springs 1304a and b, key 1308, outlet plug 1313, outlet spring 1314, outlet valve 1315, outlet valve o-ring 1316, outlet port 1312, inlet plug 1323, inlet spring 1324, inlet valve 1325, inlet valve o-ring 1326, inlet port 1322, key clip holes 1331a and b, filter clip slots 1330a-d, and posts 1363a and b are all embodiments of manifold 301, filter clip 302, key clip 303, manifold springs 304a and b, key 308, outlet plug 313, outlet spring 314, outlet valve 315, outlet valve o-ring 316, outlet port 312, inlet plug 323, inlet spring 324, inlet valve 325, inlet valve o-ring 326, inlet port 322, key clip holes 331a and b, filter clip slots 330a-d, and posts 363a and b in FIGS. 3 and 4.

Filter clip 1302 is a clip, which may have four legs that attaches the manifold 1301 to the rest of the filter system. Filter clip 1302 is discussed in detail in FIG. 18. The legs of the filter clip 1302 are inserted into the holes (e.g., slots) on the top of the manifold 1301. In an embodiment, holes (e.g., two oval holes) in the body of the filter clip 1302 fit over the posts between the holes (e.g., four slots) on the manifold 1301. The legs of the filter clip 1302 then attach to a bar on the fluid distributor (on the filter unit). This attaches the filter unit to the manifold. Filter clip 1302 may be an embodiment of filter clip 302/402 (FIGS. 3 and 4), 1802 in FIGS. 18A-18E.

The key clip 1303, may have a horseshoe shape, for example, acts to hold the key in the bottom of the manifold, so that the handle of the key hangs outside of the manifold 1301. The key clip fits around a portion of the key (the key shaft). The arms of the key clip fit into the key clip holes (e.g., two holes) on the top of the manifold such that the bottom of the key clip arms show on the top of the manifold 1301. Other clips may be used instead of the horseshoe shaped clip of FIG. 13. The key clip 1303 may be an embodiment of the key clip 1903 in FIGS. 19A-19F.

The manifold springs 1304a and b attach to the posts (see 1432a and b in FIG. 14) (which may have a cylindrical shape) on the bottom of the manifold 1301 and work with the other features to allow for removal of the manifold 1301 from the filter unit. The manifold springs 1304a and b are discussed in FIG. 13B.

The key 1308 is involved in the mechanism that allows removal of the manifold 1301 from the filter unit. The key, when turned releases the legs of the clip, such as by pushing the legs apart. The key may have a shaft that has an eccentric shape, which is wider along one axis than along another axis, and when turned (e.g., 90 degrees) releases a mechanism that holds the manifold onto the filter unit. The key is discussed in FIG. 13B.

The outlet port 1312 is the outlet part of the fluid filter system 1300 for filtered fluids to exit the system. The outlet port 1312 is a hollow tube with an outlet valve o-ring surrounding the winged portion of a valve which is attached via a spring to an outlet plug to create an outlet valve mechanism. This mechanism sits within the outlet port 1312 to function as a mechanical valve that closes when the manifold is removed from the fluid filter system 1300.

The outlet plug 1313 is not a plug in the sense of preventing the flow of fluid, but has a hole through the middle. The valve 1315 with the outlet spring 1314 is pushed down into a hole in the outlet conduit of the fluid distributor (see 321b) to stop the flow of fluid. The outlet spring pushes against outlet plug 1313 to mechanically bias outlet valve to the closed position.

The outlet spring 1314 slides onto the valve body and then is inserted into a hole in the outlet plug 1313.

The outlet valve 1315 acts with the outlet spring 1314 to mechanically bias outlet valve 1315 to the closed position by pushing against outlet plug 1313 to push outlet spring away from outlet plug.

The outlet valve o-ring 1316 sits over the winged portion of the valve 1315 and keeps liquid from moving into the outlet port, when valve 1315 is in the closed position. When in the closed position, valve 1315 pushes o-ring 1316 onto the rim of a hole in the outlet port 1312, to keep water from passing. In one embodiment, outlet valve o-ring 1315 is made of rubber, silicon, or any other soft and/or resilient fluid tight materials.

The inlet port 1322 is the inlet part of the fluid filter system 1300 for unfiltered fluids to enter the system. The inlet port 1322 is a hollow tube with an inlet valve o-ring surrounding the winged portion of a valve which is attached via a spring to an inlet plug to create an inlet valve mechanism. This mechanism sits within the inlet port 1322 to function as a mechanical valve that closes when the manifold is removed from the fluid filter system 1300.

The inlet plug 1323 is not a plug in the sense of preventing the flow of fluid, but has a hole through the middle. The valve 1325 with the inlet spring 1324 is pushed down into a hole in the inlet conduit of the fluid distributor (see 321*a*) to stop the flow of fluid. The inlet spring pushes against inlet plug 1323 to mechanically bias inlet valve to the closed position.

The inlet spring 1324 slides onto the valve body and then is inserted into a hole in the inlet plug 1323.

The inlet valve 1325 acts with the spring 1324 to mechanically bias inlet valve 1325 to the closed position by pushing against inlet plug 1323 to push inlet spring 1324 away from inlet plug 1323.

The inlet valve o-ring 1326 sits over the winged portion of the valve 1325 and keeps liquid from moving into the inlet port 1322 when valve 1325 is in the closed position. When in the closed position, valve 1325 pushes o-ring 1326 onto the rim of a hole in the inlet port 1322, to keep water from passing. In one embodiment, inlet valve o-ring 1326 is made of rubber, silicon, or any other soft and/or resilient fluid tight materials.

Key clip holes 1331*a* and *b* are provided on the manifold 1301 and accept the arms of the key clip 1303 for attaching the key 1308 to the manifold 1301. The key is placed into the key clip 1303 and the key clip 1303 is placed legs first onto the underside of the top of the manifold 1301 (the underside of the manifold 1301 faces the filter). The legs of clip 1303 may go through the key clip holes 1331*a* and *b* and the tabs on the ends of the legs hold the key clip 1303, via the key clip holes 1331*a* and *b* to the manifold 1301. See FIG. 19 for more detail about the key clip 1331.

The filter clip slots 1330*a-d* are provided on the manifold 1301 to accept the legs of the filter clip 1302 for attachment of the manifold to the rest of the fluid filter system 1300. The filter clip 1302 is a part of the mechanism that allows the user to remove the manifold 1301 from the filter unit. The filter clip 1303 is placed legs first over the top side of the manifold 1301 (which faces away from the filters), the legs are inserted through the slots, and the holes on the top of the key clip 1302 fit within posts on the top of the manifold. The legs (now on the bottom of the manifold) now serve as a holder for the filter, which is opened and closed by the key 1308. The key is placed into the key clip 1303 and between the legs of the filter clip 1302. Then, the key clip 1303 is placed legs first onto the underside of the top of manifold 1301. The filter clip 1302 is then attached to the bar on the top of the fluid distributor to attach the filter unit. See FIG. 18 for more detail about the filter clip.

The posts 1363*a* and *b* (which for example may have a noncircular cross section, such as an oval), which are on the top of the manifold 1301, act to attach and hold the filter clip 1302 from sliding sideways on top of the manifold 1301. The holes in the filter clip slide over the posts 1363*a* and *b* on the manifold 1301 and the legs extend through the slots next to the posts 1363*a* and *b* to attach the filter clip 1302 to the manifold 1301.

Figure 14:
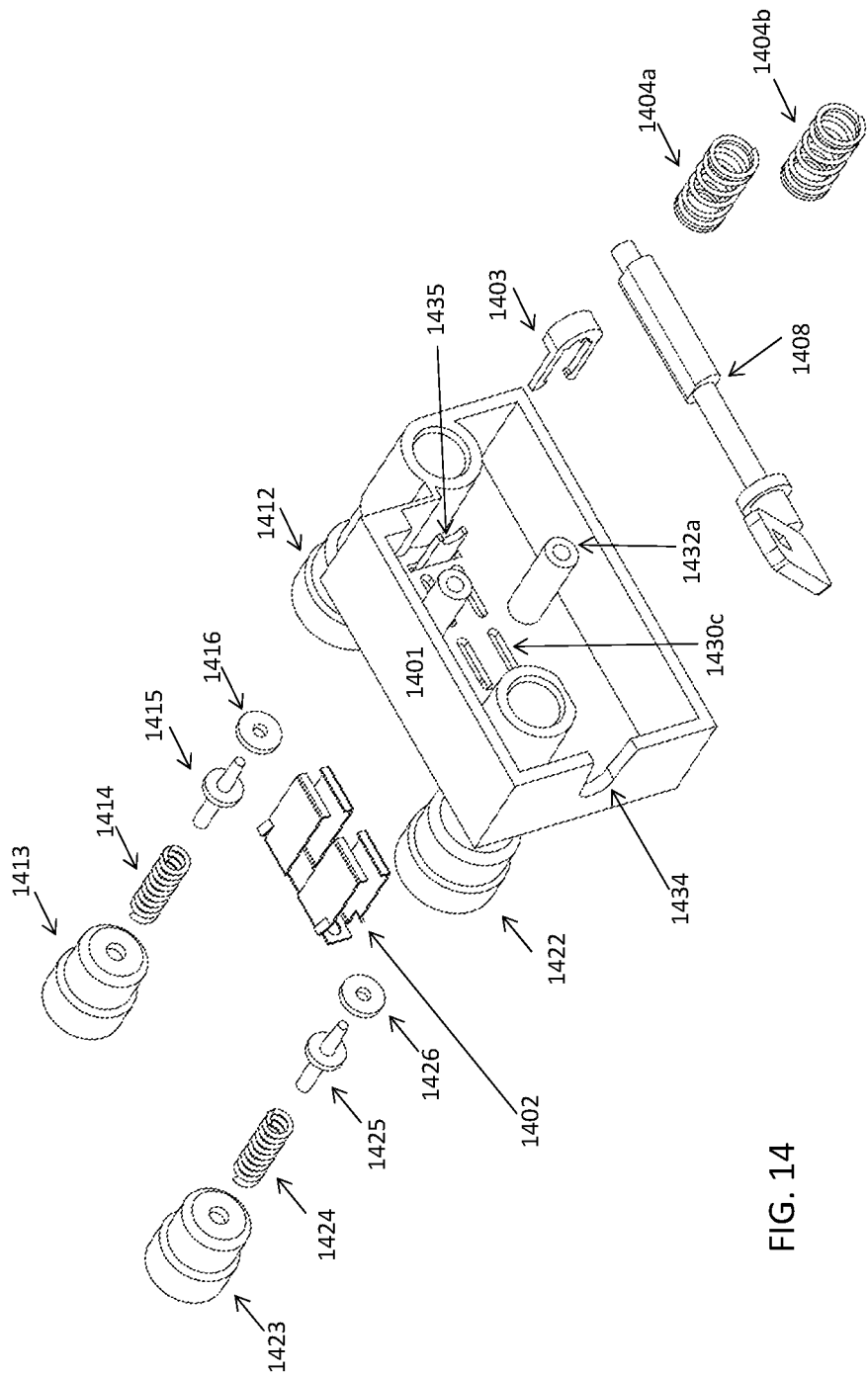
FIG. 14 shows an exploded view of an embodiment of a manifold for the fluid filter system from the bottom.

FIG. 14 shows a bottom exploded view of an embodiment of a manifold 1401 for the fluid filter system 1400. The manifold may include filter clip 1402, key clip 1403, manifold springs 1404*a* and *b*, key 1408, outlet plug 1413, outlet spring 1414, outlet valve 1415, outlet valve o-ring 1416, outlet port 1412, inlet plug 1423, inlet spring 1424, inlet valve 1425, inlet valve o-ring 1426, inlet port 1422, key clip holes 1431*a* and *b*, filter clip slots 1430*a-d*, and posts 1463*a* and *b*. Manifold 1401 may be an embodiment of manifold 101 in FIGS. 1A-1F, manifold 301 in FIGS. 3 and 4, manifold 1301 in FIG. 13, manifold 1501 in FIGS. 15A and 15B, and manifold 1601 in FIGS. 16A-16H.

Filter clip 1402, key clip 1403, springs 1404*a* and *b*, key 1408, outlet plug 1413, outlet spring 1414, outlet valve 1415, outlet valve o-ring 1416, outlet port 1412, inlet plug 1423, inlet spring 1424, inlet valve 1425, inlet valve o-ring 1426, inlet port 1422, key clip holes 1431*a* and *b*, filter clip slots 1430*a-d*, key-hold 1435, cylinder 1432*a* and *b*, key notch 1434, and oval protrusions 1463*a* and *b* were discussed above in FIG. 13 as filter clip 1302, key clip 1303, manifold springs 1304*a* and *b*, key 1308, outlet plug 1313, outlet spring 1314, outlet valve 1315, outlet valve o-ring 1316, outlet port 1312, inlet plug 1323, inlet spring 1324, inlet valve 1325, inlet valve o-ring 1326, inlet port 1322, key clip holes 1331*a* and *b*, filter clip slots 1330*a-d*, and posts 1363*a* and *b*.

Key-hold 1435 may be a rectangular protrusion with a rounded groove that fits around the top of the key shaft to hold the key in place in the bottom of the manifold. In an alternative embodiment, key-hold 1435 and the top of key-hold 1435 may have another shape. For example, key hold 1435 may have a square notch instead of a curved surface where the key rests on key-hold 1435. Key-hold 1435 works with key clip to hold the key in place. However, the key can be rotated 360 degrees even when held in place.

The posts 1432*a* and *b* on the bottom of the manifold 1401 function with the key 1408 and the key clip 1403 to provide a mechanism to remove the manifold from the filter unit if the user wishes to change a filter or some other part of the fluid filter system 1400. The manifold springs 1404*a* and *b* fit over the posts 1432*a* and *b*. When the key is turned, so that the wide part of the shaft on the key pushes the legs of the filter clip apart, the filter clip detaches from the bar on the fluid distributor. The manifold springs 1404*a* and *b* then push against the trough on the housing cap helping to detach the rest of the fluid filter system from the manifold 1401.

Key notch 1434 is a hole in the side of the manifold 1401 that allows the handle of the key to hang outside of the manifold 1401 for the user to grip and turn up to 360 degrees.

FIGS. 15A and B show a cross-sectional view of a manifold as attached to the fluid filter system. FIG. 15A shows a front view and FIG. 15B shows a side view. The two views provide an illustration of the attachment mechanism for the manifold onto the filter unit as well as the valve system for controlling the directional flow of fluid into and out of the manifold. Manifold 1501 may be an embodiment of manifold 101 in FIGS. 1A-1F, manifold 301 in FIGS. 3 and 4, manifold 1301 in FIG. 13, manifold 1401 in FIG. 14, and manifold 1601 in FIGS. 16A-16H.

Valve system: The valves in FIGS. 15A and B are in the closed position because and are not depressed.

Attachment system: The key 1508 is shown in an attached position because the wide part of the key, the barrel 1582 (e.g., the long axis of the oval cross section of the oval sleeve) is positioned up and down, and consequently the legs 1502a and b of the manifold clip 1502 are in relaxed position. As such, the key 1508 is not pushing against and not deforming the legs 1502 a and b of the filter clip 1502 and the mechanism is not opened. If the user would like to reattach the manifold 1501, the user needs to rotate the key 1508 (e.g., by 90 degrees) so that the wide part of the barrel 1582 of the key 1508 pushes the legs of the filter clip 1502 open. Then the user needs to place the manifold 1501 onto the filter unit and turn the key 1503 (e.g., 90 degree) to close the mechanism and grab/latch onto the top of the filter unit.

FIGS. 16A-16H show an embodiment of a manifold 1601 for a fluid filter system. FIG. 16A-16H provides a detailed view of the mechanism that controls the attachment and/or detachment of the manifold from the filter unit. Manifold 1601 may be an embodiment of manifold 101 in FIGS. 1A-1F, manifold 301 in FIGS. 3 and 4, manifold 1301 in FIG. 13, manifold 1401 in FIG. 14, manifold 1501 in FIGS. 15A and 15B, and manifold 1601 in FIGS. 16A-16H.

FIG. 16A shows a bottom view of the manifold 1601 with the manifold attachment mechanism attached. The manifold 1601 may include key clip 1603, key 1608 with barrel 1682, outlet port 1612, inlet port 1622, posts 1632a and b, hooks 1676 on the legs of filter clip 1677b. In other embodiments, manifold 1601 may not include all of the components listed and/or may include other components in addition to or instead of those listed above.

The manifold 1601 includes the parts of the mechanism that allow for attachment and detachment. The manifold is attached to the fluid distributor (and thus to the filter unit) via the legs of the key clip, the conduits on the fluid distributor which fit into the bottom part of the inlet and outlet port, and the cylinders which fit into the ports on the housing cap below the fluid distributor. However, the mechanism that locks the manifold onto the filter unit is the attachment of the filter clip onto a bar on the fluid distributor.

The key clip 1603 holds the key onto the manifold 1601, while allowing rotational movement of the key 1608. The contoured (e.g., curved) shoulder of the key clip 1603 and the contoured (e.g., curved) surface of the key-hold fit around and hold the key shaft of the key. Only the shoulder of the key clip is showing in FIG. 16A. The shoulder of the key clip fits over a portion of the key shaft in such a way that the key shaft can turn rotationally. Then, the arms of the key clip slide into two holes on the underside of the top of the manifold 1601 holding the key onto the manifold 1601 (see also FIG. 19 for a discussion of the key clip).

The key 1608 with barrel 1682 can be turned by the user to two positions. In one position, the thinner part of the key shaft sits within the legs of the filter clip without deforming the legs out. In the other position (e.g., a 90 degree turn either way), the key shaft sits within the legs of the filter clip with the wider part of the barrel 1682 pushing the legs apart and detaching the legs from the rest of the fluid filter system 1600 (see also FIG. 17 for a discussion of the key). In FIG. 16A the key is positioned with walls of the thin part of the barrel 1682 facing the legs of the filter clip, so the legs are not deformed. The configuration of 16A is when the manifold 1601 is attached to the filter unit.

Outlet port 1612 is not involved in the key mechanism. Outlet port 1612 is discussed with reference to FIG. 3 as outlet port 312.

Inlet port 1622 is not involved in the key mechanism. Inlet port 1622 is discussed with reference to FIG. 3 as inlet port 322.

Posts 1632a and b on the manifold are involved in the key mechanism. Posts 1632a and 1632b hold manifold springs (see 304a and 304b in FIG. 3) to the manifold 1601. When the manifold is connected to the filter unit, the manifold springs are held in place by the troughs (see 656a and 656b in FIG. 6) on the housing cap (see 654 in FIG. 6). When the key is turned to deform the filter clip, the attachment between the posts 1632a and b on the manifold and the troughs on the housing cap is broken, allowing the springs to push against the housing cap. This allows the user to separate the manifold from the filter unit.

Hooks 1676 on the legs of filter clip 1677b attach to a bar (see 320) on the fluid distributor. The hooks 1676 on the legs 1677 of the filter clip 1602 fit under the bar into an opening under the bar (e.g. like a handle). When the key is turned such that the wider part of the barrel (the oval part) of the key fits between the legs of the filter clip, the legs are deformed out and the attachment to the bar on the fluid distributor is broken, allowing the user to separate the manifold from the filter unit.

FIGS. 16B and 16F show side views of the manifold 1601 from both sides. In the figures, the manifold 1601 includes the key 1608, the outlet port 1612, inlet port 1622, the key notch 1634. In other embodiments, manifold 1601 may not include all of the components listed and/or may include other components in addition to or instead of those listed above.

Key 1608, the outlet port 1612, and inlet port 1622 were discussed above in FIG. 16A. The key notch 1622 is a cut-out of the manifold that allows the handle of the key to be outside of the manifold so it can be gripped and turned by the user. In some embodiments, the position of the key that allows the user to remove the manifold is indicated on the side of the manifold. In other embodiments, the user may turn the key until the manifold is released. In other embodiments, when the key handle is pointed to either side of the manifold, the manifold can be removed. When the key is pointed up or down, the manifold is locked on or off.

FIG. 16C is a front view of the manifold 1601. The manifold 1601 can include the key 1608, the outlet port 1612, tab 1617a, inlet port 1622, and posts 1663a and b. In other embodiments, manifold 1601 may not include all of the components listed and/or may include other components in addition to or instead of those listed above.

Key 1608, the outlet port 1612, and inlet port 1622 were discussed in FIG. 16A. However, the only part of the key 1608 that is showing from the top of the manifold is the handle of the key (see 1789 in FIG. 17).

Tab 1617a is one of the tabs 1617a and b on the legs of the key clip (1903 in FIG. 19) and functions as a hook. When the legs of the key clip are pushed up through the holes on the manifold (334a and b in FIG. 3), the key clip is held onto the manifold (and thus the key is held onto the manifold. Only the end of the tabs protrude onto and show on the top of the manifold in FIG. 16C. The key clip works with the key-hold (see 1435 in FIG. 14) and functions to attach the key 1618 to the manifold.

Posts 1663a and b are the protrusions on the manifold that the oval holes on the body of the filter clip slide over when the filter clip is inserted into the slots on the top of the manifold. The filter clip is inserted to that the body of the clip stays on the outside of the manifold, while the four legs are pushed through to the bottom of the manifold (see also FIG. 16G).

FIGS. 16D and 16E show similar aspects of the manifold, while 16D is a top view and 16E is a top perspective view of the manifold 1601. In the figures, the manifold 1601 can include key 1608, outlet port 1612, tab 1617, inlet port 1622, slots 1630a-d, posts 1663a and b and body of filter clip 1678. In other embodiments, manifold 1601 may not include all of the components listed and/or may include other components in addition to or instead of those listed above.

Key 1608, outlet port 1612, tab 1617, inlet port 1622, slots 1630a-d, posts 1663a and b and body of filter clip 1678 were discussed in FIGS. 16A-16C. FIG. 16D provides a clear view of the body of the filter clip that sits on the top of the manifold when the holes in the body 1678 slide over the posts 1663a and b. The legs of the filter clip slide down into the slots 1630a-d on the top of the manifold. All four of the slots, of the embodiment of the drawings, are shown in FIG. 16D, but only one of the slots is labeled.

FIGS. 16G and H are two bottom perspective views of the manifold 1601. Both views show the same aspects from slightly different perspectives. The manifold 1601 can include key clip 1603, key 1608 with barrel 1682, outlet port 1612, outlet valve 1615, inlet port 1622, inlet valve 1625, posts 1632a and b, and hooks 1676 on the legs 1677b of filter clip. In other embodiments, manifold 1601 may not include all of the components listed and/or may include other components in addition to or instead of those listed above.

Key clip 1603, key 1608 with barrel 1682, outlet port 1612, outlet valve 1615, inlet port 1622, inlet valve 1625, posts 1632a and b, and hooks 1676 on the legs of filter clip 1677b were discussed in FIGS. 16A-16F. In FIGS. 16G and 16H, the bottom of the inlet valve 1625 and the outlet valve 1615 are shown within the inlet port 1622 and the outlet port 1612.

FIGS. 17A-17D show an embodiment of the key 1708 for the fluid filter system 1700. Key 1708 functions to allow removal of the manifold from the fluid filter system 1700. The key 1708 is turned to release a spring in the manifold that detaches the manifold from the rest of the filter unit. The key 1708 is turned approximately 90 degrees such that the oval part of the key 1708 (oval sleeve) pushes the legs of the filter clip apart and releases a bar on the fluid distributor. The portion of the fluid filter system 1700 having the fluid distributor (the filter unit) is separated from the manifold. The key 1708 may be an embodiment of key 308 in FIG. 1, key 308 in FIGS. 3 and 4, key 1308 in FIG. 13, key 1408 in FIG. 14, key 1508 in FIG. 15A, and key 1608 in FIGS. 16A-16H.

FIG. 17A shows a side view of the key 1708 for the fluid filter system 1700. The key 1708 may include a key shaft 1781, a barrel 1782, a key collar 1786, a key neck 1787, a grip 1788, and a key handle 1789. In other embodiments, the key 1708 may not include all of the components listed and/or may include other components in addition to or instead of those listed above.

Key shaft 1781 is a rod (e.g., having a circular cross section) of a diameter less than the barrel of the key. The key shaft 1781 fits along the manifold between the posts and through the key notch. The key shaft 1781 fits within the filter clip without pushing the legs of the filter clip out. Thus, the diameter of the key shaft 1781 is chosen to be at least little less than the width between two of the legs of the filter clip (e.g., less than the width of the body of the filter clip).

Barrel 1782 is a noncircular protrusion on the circular rod, near the end of the circular rod furthest from the handle. In an embodiment barrel 1782 is shaped to have a cross section that is noncircular, such as an oval (or a rectangle, ellipse, two back-to-back trapezoids, for example), such that the thin side of the barrel is about the width of the diameter of the key shaft 1781 and the wide side of the barrel is larger than the diameter of the key shaft 1781. The wider part of the barrel should be of a size to push the legs of the filter clip outward. The barrel 1782 may be constructed separately from the key shaft 1781 or the key shaft 1781 may be formed (e.g., in a mold) to have the barrel 1782. Optionally, the part of the key shaft that is not between the legs of the filter clip may be wider than the distance between the legs of the filter clip.

Key collar 1786 is a circular flange on the key 1708 toward the handle-end of the key 1708 (near the handle) that has a diameter greater than the diameter of the key shaft 1781. Key collar 1786 serves to hold the key 1708 on one side of the key notch (on the manifold) so that the handle of the key 1708 is outside of the manifold and the rest of the key 1708 is held inside of the manifold. In an embodiment, key collar 1786 sits inside the manifold (see, for example, FIG. 15), so that the key does not slide out of position to a position where the key would not function properly.

Key neck 1787 is a part of the key 1708, which in an embodiment may have a diameter that is smaller than the key collar 1786. Key neck 1787 is a shaft located between the key handle and key collar 1786. Key neck 1787 sits upon the key notch in the manifold. When the key 1708 is turned, the key neck 1787 may turn while still within the key notch.

Grip 1788 may be an opening (e.g., a square, rectangular, or other shaped opening) in the handle of the key 1708 that may function as a grip. Alternative embodiments may have other shaped openings, no opening, more openings, and/or other types of structures that increase the grip ability of the handle. Grip 1788 and the square opening are optional.

Key handle 1789 is the part of the key 1708 that the user grips to turn the key 1708 and remove the manifold from the filter unit. In an embodiment, key handle 1789 is rectangular. However, key handle 1789 may have any shape or size as long as it is large enough to grip.

FIG. 17B shows a bottom view of the key 1708. The view of FIG. 17B shows the difference in widths or diameters of an embodiment of the key shaft 1781 (the middle portion), the oval 1782 and the key collar 1786. FIG. 17C shows a front view of the key 1708 showing the wider part of the oval 1782 as compared to the diameter of the key shaft 1781. FIG. 17D shows a perspective view of the key 1708. The perspective view of FIG. 17D, shows the oval shape of an embodiment of the barrel 1782.

FIGS. 18A-18E show an embodiment of a filter clip 1802 for the fluid filter system 1800. The filter clip 1802 works with the key to allow the user to remove the manifold from the rest of the fluid filter system 1800. An embodiment of the filter clip may have four legs and a body. The four legs of the filter clip 1802 are separated from each other at a distance such that the thin part of the barrel on the key can fit between the legs without deforming the legs. When the key is turned so that the wider part of the barrel is fitted between the legs of the filter clip, the legs are deformed outward, and the manifold is released. Thus, the filter clip removably attaches the manifold to the fluid filter system 1800. In an embodiment, the filter clip has four flexible legs that can be moved outward from the natural position. When the legs are moved outward or deformed, the manifold is released from the fluid filter system 1800. This allows the user to replace the filter unit, one or more filter housings and/or one or more filters. Filter clip 1802 may be an embodiment of filter clip 302 in FIGS. 3 and 4, filter clip 1302 in FIG. 13, filter clip 1402 in FIG. 14, filter clip 1502 in FIG. 15, for example.

FIG. 18A shows a top perspective view of the filter clip 1802. The filter clip may include holes 1875a and b, hooks 1876 a-d, legs 1877a-d, body 1878, and tabs 1879a-d. In other embodiments, the filter clip 1802 may not include all of the components listed and/or may include other components in addition to or instead of those listed above.

Holes 1875a and b may be two holes in the body of the filter clip that attach the filter clip to the manifold. The two holes fit over oval protrusions on the top of the manifold (see FIG. 13) and the legs fit into slots within the manifold. Holes 1875a and b may have a noncircular shape, such as an oval, ellipse, rectangle, triangle, or other shape. There may be only one hole or there may be more than one hole instead of holes 1875 a and b.

The hooks 1876 a-d on the legs are folded areas that are perpendicular to the legs that fit over a bar on the fluid distributor, so as to grab the bar when the bar is between the legs and the legs are in a relaxed position. The hooks fit in a space under the bar on the fluid distributor.

The legs 1877a-d of the filter clip may have multiple functions. The legs attach to the filter unit, via the bar on the fluid distributor to the manifold. The legs may also serve as part of a holder of the key, keeping the key aligned and, when the key is turned such that the larger part of the barrel (the oval portion) fits between the legs, the legs are distorted outward and the manifold is removed from the filter unit. The legs may be constructed of a resilient material (e.g., a resilient plastic or a metal, such as copper, aluminum, or steal) that allows some flexibility when distorted without breaking and returns to the undistorted shape, when the forces distorting the material removed.

The body 1878 of the filter clip may be a rectangular portion perpendicular to the four evenly spaced legs. The body 1878 may be a little wider than the width of the key shaft to accommodate the key shaft between the legs of the filter clip. The body may be constructed of the same material as the legs or the legs may be constructed of a more flexible material than the body. Alternatively, the leg may be at an angle other than 90 degrees with respect to the body of the manifold clip, and body may be wider or narrower than the key shaft or the narrow part of the barrel of the key, so long as the legs are angled to be in a relaxed position when the walls of narrow part of the barrel face the legs.

The tabs 1879a-d are portions of the legs 1877a-d that are cut and moved outward to create a tab structure on each leg. Tabs 1879a-d are angled to act as hooks, so as to slide through the slots in the manifold when inserting the clip into the manifold, and then prevent the filter clip from sliding back out of the slots, so that the filter clip does not accidently become dislodged from the locations in which the filter clip is intended to function. The tabs 1879a-d are optional.

FIG. 18B shows a side view of the filter clip 1878. This view shows the shape of the tabs 1879a-d. This view also shows that the legs have hooks that fold toward the middle of the filter clip. The key shaft fits within the width of the filter clip such that the legs are held in the position shown in FIG. 18B.

FIG. 18C shows a top view of the filter clip 1878, showing the shape and positioning of the holes 1875a and b on the body 1878 of the filter clip. FIG. 18D shows a front view of the filter clip 1878, showing the positioning of the legs on the filter clip. The size of the space between the legs on each side of the filter clip is variable because the space does not serve any particular purpose. However, the ovals on the manifold must be positioned based on the size of the space between the legs. FIG. 18E shows a bottom perspective view of the filter clip 1878. FIG. 18E shows the positioning of the tabs.

FIGS. 19A-19F show an embodiment of a key clip 1903 for the fluid filter system 1900. Key clip 1903 holds the key in place. The key clip 1903 fits around the bottom of the key and hooks into two holes (see 131a and b in FIG. 3) in the manifold to hold the key in place. Key-hold (see 1435 in FIG. 14) on the manifold has a curve that fits around the top of the key and works with the key clip 1903 to hold the key while allowing rotational movement of the key. Key clip 1903 may be an embodiment of key clip 303 in FIGS. 3 and 4, key clip 1303 in FIG. 13, key clip 1403 in FIG. 14, key clip 1503 in FIG. 15, and key clip 1603 in FIGS. 16A and 16H, for example.

FIG. 19A shows a front perspective view of the key clip 1903. The key clip 1903 may include arms 1906a and b, tabs 1917a and b, and shoulder 1962. In other embodiments, the key clip 1903 may not include all of the components listed and/or may include other components in addition to or instead of those listed above.

The arms 1906a and b of the key clip function to wrap around the key and attach it to the manifold. The tabs 1917a and b on the arms of the key clip fit within holes in the manifold (see 1433a-d in FIG. 14) to hold the key in place.

The shoulder 1962 of the key clip provides support for the arms. The curved shoulder 1962 wraps around the key shaft. Therefore, the inner diameter of the shoulder 1962 is chosen to snuggly fit around the key shaft. The shoulder 1962 may be thicker than the arms 1906a-b to provide a more stable surface.

FIG. 19B shows a front view of the key clip 1903. The view of FIG. 19B shows the tabs 1917 on the arms 1906. The view of FIG. 19B also shows that the shoulder 1962 is thicker than the arms 1906. The shoulders of the embodiment of FIG. 19B are thicker because the shoulder 1962 needs to wrap around the key shaft and provide strong support, while the arms 1906 need to fit within holes in the manifold to hold the key clip 1903 to the manifold.

FIG. 19C shows a side view of the key clip 1903. The FIG. 19C view shows the difference in thickness between the arms 1906a and b and the shoulder 1962. The difference in width may be due to separate construction of the shoulder 1962 and arms 1906a and b. Alternatively, the key clip 1903 may be constructed from one material (e.g., in a mold). FIG. 19D shows a top view of the key clip 1903, showing only the top of the shoulder 1962, while FIG. 19E shows a bottom view of the key clip 1903 showing the tabs 1917a and b, and the shoulder 1962. FIG. 19F shows a back perspective view of the key clip 1903. The front perspective view shows the same parts of the key clip 1903 as the front perspective view, but from a slightly different perspective.

FIGS. 20A-G show an embodiment of a valve 2015 or 2025 for the fluid filter system 2000. The valve 2025 works together with a spring and a plug on the inlet and outlet ports to form a mechanical valve. For example, the inlet port (322 in FIG. 3), inlet plug (323 in FIG. 3), inlet spring (324 in FIG. 3), inlet valve (325 in FIG. 3), and inlet valve o-ring (326 in FIG. 3) function to form a valve 2025b that allows fluids to only enter the inlet port when the filter unit is attached to the manifold. Valve 2025 is a mechanically driven valve that controls access of unfiltered fluid through an inlet opening in the manifold into the filter unit of the fluid filter system 2000. In an embodiment, the valve 2025 is biased to close the inlet opening, so that the inlet opening is closed when the manifold is detached from the filter unit. When the valve 2025 is depressed toward the top of the manifold, a flow path is formed through the inlet opening, allowing unfiltered fluid to enter the filter unit of the fluid filter system 2000. The outlet valve 2015 works very much the same in that liquid is allowed to flow out of the outlet port only when the filter unit is connected to the manifold. Valve 2015 or 2025 may be an embodiment of valve 315 or 325 in FIG. 3, valve 1215 or 1225 in FIG. 12, valve 1315 or 1325 in FIG. 13, valve 1415 or 1425 in FIG. 14, and valve 1515 or 1525 in FIG. 15A or 15B.

FIG. 20A shows a front view of the valve 2025 or 2015 for the fluid filter system 2000. The valve will be discussed as the inlet valve 2025. However, the outlet valve may be identically or similarly constructed. The valve 2025 can include wing structure 2085, valve body 2083, and valve collar 2084. In other embodiments, the valve 2025 (or 2015) may not include all of the components listed and/or may include other components in addition to or instead of those listed above.

Wing structure 2085 may include one or more fins and is the structure at the bottom of the valve that tapers down to a smaller diameter than the valve body. The hole that is selectively blocked by valve 2025 is not on the same side of the valve as wing structure 2085. The tapering part of the structure includes a number of wings which eases the insertion of valve 2025 into the hole that is selectively blocked by valve 2025. In the open position, the wing structure may sit in the hole that is selectively blocked by the valve 2025, and the presence of the wing structure may allow more fluid to pass through the hole while in the open position. The wing structure and the tapering is optional.

In an embodiment valve body 2083 may be a tubular or cylindrical structure or may have another shape (e.g., square rectangular, polygonal). The spring attaches to the valve on the portion of the valve body 2083 that is on the other side of the valve collar from wing structure 2085.

The valve collar 2084 is a flange (e.g., a circular flange) of a diameter to close the hole in the inlet port or outlet port when the valve is in the closed position. The valve collar 2084 (e.g., in combination with optional o-ring 316 or 326 of FIG. 3)) prevents fluids from flowing through the inlet port or outlet port when the closed position.

FIG. 20B shows a bottom view of the valve 2025 showing the shape of the hole in the winged structure 2085. FIGS. 20C and D show two side views of the valve, showing it is a circular structure that looks identical from all side views. FIG. 20E shows a top perspective view of the valve 2025, showing the difference in diameter of the valve body and the valve collar 2084. FIG. 20F shows a top view of the valve showing the larger hole in the valve body, which tapers to a smaller hole in the winged structure. FIG. 20G shows a bottom perspective view showing all of the same components of FIG. 20A but from a slightly different angle.

Method of Use/Changing the Filter

Figure 21:
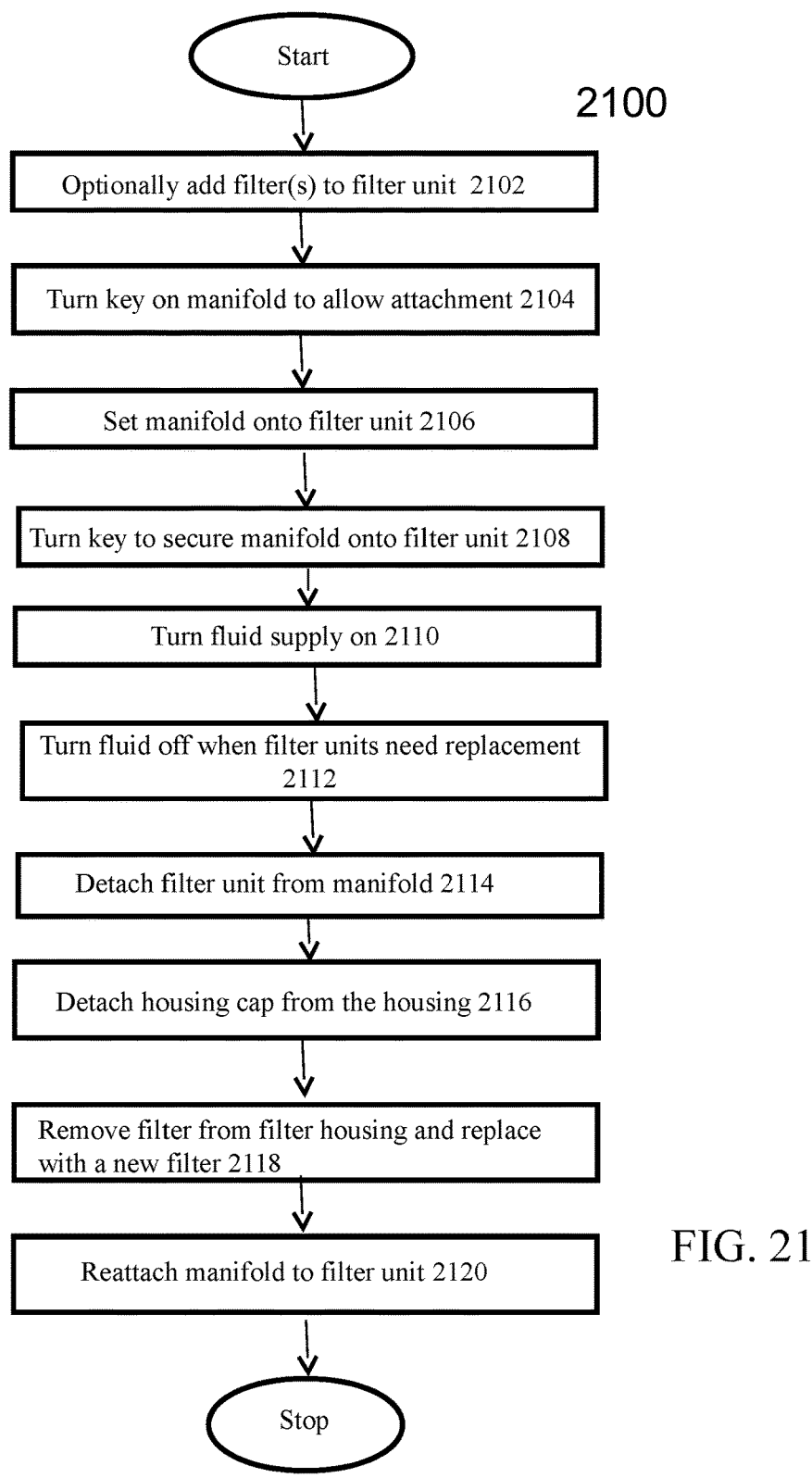
FIG. 21 shows a flowchart of an embodiment of a method of using the fluid filter system.

FIG. 21 is a flowchart of an embodiment of a method 2100 of using the fluid filter system. The fluid filter system mentioned in FIGS. 21 and 22 may be any of the embodiments of the fluid filter systems in this specification.

In step 2102, optionally one or more filters are added to the filter unit. Any filter that is no longer operable because it is too dirty, overused, has a hole, is damaged, etc. is changed. In some embodiments, only one of the filters is changed. In other embodiments, both of the filters are changed. To insert the filter into the filter unit, the filter unit is removed from the base, then the filter housings are removed from the housing cap (by unscrewing the filter housings). Then the filter cap is removed, the old filter is removed and a new filter is added. When the new filter is added, the steps are performed backwards to allow attachment of the manifold.

In step 2104, the key (308 in FIG. 3) on the manifold is turned to allow attachment of the manifold. The key is turned so that the barrel (the thick part) of the key shaft is situated within the legs of the filter clip (see 302 in FIG. 3). Turning the key so that the thick part of the barrel is perpendicular to the direction the legs of the clip would be oriented without deformation, results in a deforming the legs of the filter clip outward so that the legs of the clip can be placed over a bar on the fluid distributor (see 307 in FIG. 3) in readiness to attach to the bar.

In step 2106, the manifold is set on the filter unit. The manifold is set on top of the filter unit with the cylinders (see 332 in FIG. 3) having springs (see 304a and b in FIG. 3) on the manifold fitted into the troughs (see 356 in FIG. 3) on the housing cap. When the cylinders are attached to the troughs on the housing cap, the spring is pushed to a tighter position.

In step 2108, the key is turned to secure the manifold to the filter unit. The key is turned so that the thin part of the key shaft is situated within the legs of the filter clip (see 302 in FIG. 3). Each leg of the filter clip has a hook that attaches to a bar on the fluid distributor (see 307 in FIG. 3) when the key is turned so that the thin part of the key shaft is situated with the walls of the thin part of the barrel facing the legs of the filter clip and so that the legs are in a relaxed position.

In step 2110, the fluid supply is turned on. The fluid flows via the inlet port in the manifold through the fluid distributor and into one or more filter units of the fluid filter system, next passing through the filter, and then into the outlet channel and out of the outlet port of the manifold.

In optional step 2112, the fluid supply is shut off when one or more filter units need to be replaced.

In step 2114, the filter unit is detached from the manifold by turning the key. The key is turned so that the oval sleeve (the thick part) of the key shaft is situated within the legs of the filter clip (see 302 in FIG. 3). This results in a deformation of the legs of the filter clip outward so that the legs are pulled away from the bar on the fluid distributor (see 307 in FIG. 3).

In step 2116, the housing cap is detached from the housing. When the legs of the filter clip are detached from the bar, the spring on the cylinder of the manifold pushes away from the troughs on the housing cap, making removal of the manifold from the rest of the fluid filter unit (the housing) easier.

In step 2118, the old/used filter is removed from the housing and a new filter is inserted into the housing in place of the old filter. Optionally the whole filter unit is replaced.

In step 2120, the manifold is reattached to the filter unit. In at least one embodiment, after the step 2120, the method 2100 may proceed to the step 1204 to ready the unit for filtering and to start filtering the fluid using the new filter. In at least one embodiment, steps 2102 to 2120 are used to replace the filter and/or for maintenance, and may be performed when necessary (e.g., at a certain frequency, such as every few days, weeks, months, or years). Alternatively, the steps 2102-2120 may be replaced by one step in which a new filter unit/filter cartridge is connected to the manifold. For example, after changing the filter multiple times, while still reusing the same filter unit, it may be desirable to replace the filter unit also.

In an embodiment, each of the steps of method 2100 is a distinct step. In another embodiment, although depicted as distinct steps in FIG. 21, steps 2102-2120 may not be distinct steps. In other embodiments, method 2100 may not have all of the above steps and/or may have other steps in addition to or instead of those listed above. The steps of method 2100 may be performed in another order. Subsets of the steps listed above as part of method 2100 may be used to form their own method.

Method of Assembly

Figure 22:
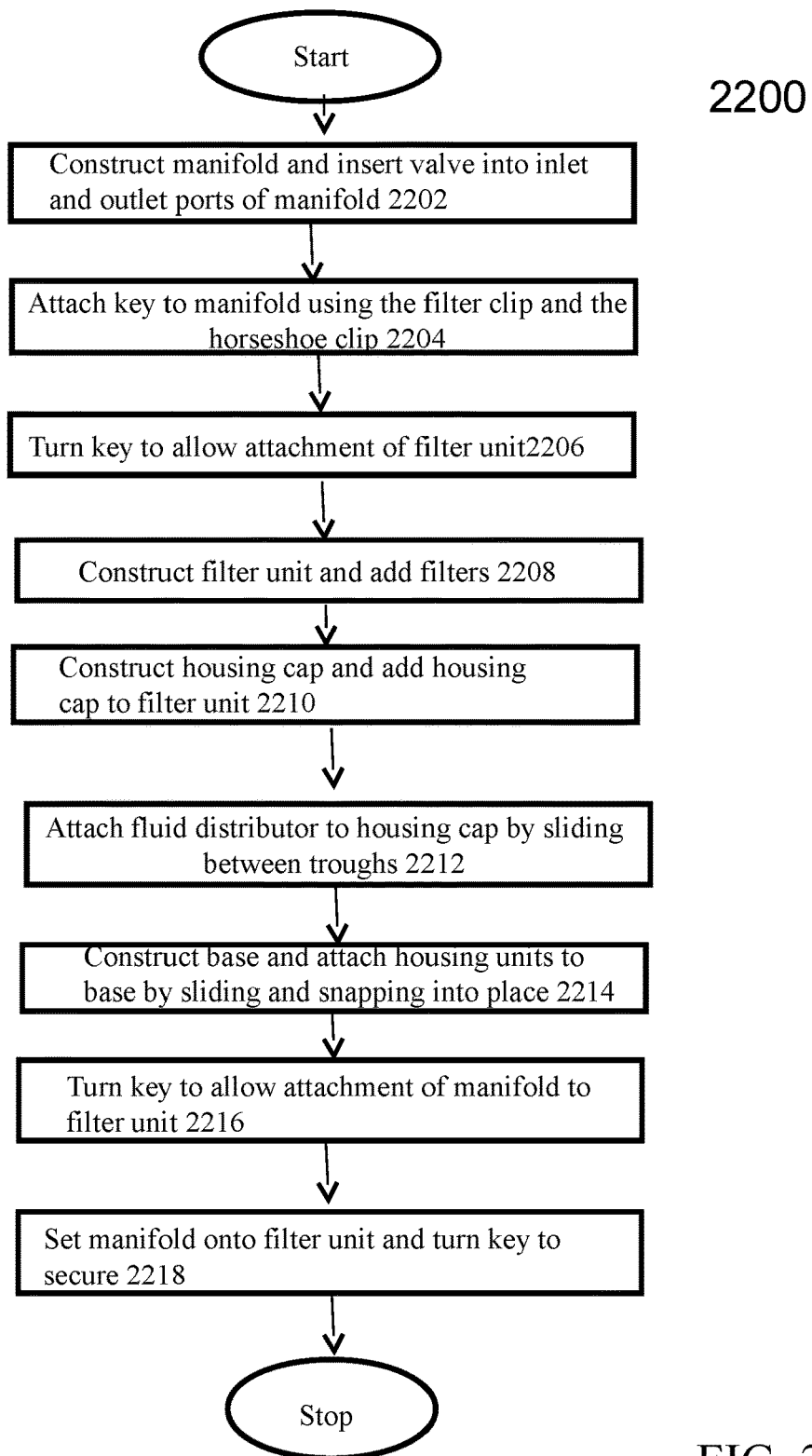
FIG. 22 is a flowchart of an embodiment of a method of making the fluid filter system.

FIG. 22 is a flowchart of an embodiment of a method 2200 of making the fluid filter system. The fluid filter system mentioned in FIGS. 21 and 22 may be any of the embodiments of the fluid filter systems in this specification.

In step 2202, the manifold (e.g., manifold 101, 201, 301) is constructed and a valve is inserted into inlet and outlet ports of manifold. Springs are added to the cylinders on the manifold. The filter clip is inserted into the slots on the manifold and posts on the top of the manifold so that the legs hang down under the manifold and the posts stick through the body of the filter clip.

In step 2204, the key is attached to the manifold using the filter clip and the key clip. The bottom part of the key is inserted into the shoulder of the key clip and the part of the key shaft having the oval sleeve is inserted between the four legs of the filter clip. The handle of the key is inserted into the hole in the side of the manifold (the key notch). See FIGS. 3, 301, 303, 304, 302 and 308.

In step 2206, the key is turned to allow attachment of the filter unit. The key is turned so that the wide part of the oval sleeve on the key is between the legs of the filter clip deforming the legs outward (see FIG. 17 for key structure).

In step 2208, the filter unit is constructed and filters are added. Each filter unit includes a housing end cap, a filter end cap, a hollow columnar filter and a filter cap having a conduit (see FIGS. 3, 347, 342, 345, 346 and 327).

In step 2210, fluid distributor is constructed and added to the housing cap by sliding the fluid distributor between the troughs to sit on top of the housing cap. The fluid distributor is constructed with two conduits on the top that can sit inside the manifold ports on the manifold. The fluid distributor also has two channels, one for directing unfiltered water into the inlet channel on the housing cap below the fluid distributor, the other for directing filtered water into the outlet port on the manifold. The fluid distributor is attached to the manifold via the conduits.

In step 2212, the housing cap is constructed and the housing cap is added to the housing. The housing cap is constructed to attach to the manifold via two troughs (that attach to the cylinders with springs on the manifold). The housing cap also includes channels that channel fluids into and out of the fluid filter unit. The housing cap is fitted onto the manifold directly via the two troughs and is constructed so that the two troughs fit on either side of the thinner part of the fluid distributor (see 354, and 356 in FIG. 3).

In step 2214, the base is constructed and the housing units are attached (removably) to the base by sliding the housing units onto the base and snapping the housing units into place (see FIG. 8 for an embodiment of construction of the base 890).

In step 2215, the filter unit is produced by attaching the filter unit in step 2208 to the housing cap by attaching the conduits on the filter tops into the ports on the housing cap.

In step 2216, the manifold is set on the filter unit by attaching the cylinders on the manifold to the troughs on the housing cap and pushing the springs on the cylinders down. The legs of the filter clip sit over the bar on the fluid distributor ready to be attached.

In step 2218, the key is turned to secure the attachment of the filter unit to the manifold. The key is turned so that the thin part of the oval sleeve of the key is positioned between the legs of the filter clip, so that the hooks on the legs can be inserted under the bar.

The construction of the filter unit, the construction of the manifold, the construction of the base, the construction of the fluid distributor, and the construction of the housing cap, could be performed in any order and/or in parallel within one another.

In an embodiment, each of the steps of method 2200 is a distinct step. In another embodiment, although depicted as distinct steps in FIG. 22, steps 2202-2218 may not be distinct steps. In other embodiments, method 2200 may not have all of the above steps and/or may have other steps in addition to or instead of those listed above. The steps of method 2200 may be performed in another order. Subsets of the steps listed above as part of method 2200 may be used to form their own method.

EXAMPLES OF SOME EMBODIMENTS

Example 1

A filter system that comprises a top portion having an inlet, an outlet and a connector for detachably connecting the top portion from a manifold;
the top portion having at least two filter housings and at least two removable filters, with at least one removable filter in each filter housing;
a detachable bottom portion that is detachably attached to the top portion;
wherein the detachable bottom portion detachably connects to the top portion so that one or more of the at least two removable filters can be replaced.

Example 2

The filter system of Example 1, wherein the bottom portion includes at least one detachable bottom portion for each of the filter housings, and the detachable bottom portions each individually detach from the top portion to replace the removable filter.

Example 3

The filter system of Example 1, each removable filter including a filter cap that has a conduit that attaches to and forms a fluid tight seal with an outlet channel in the top portion.

Example 4

The filter system of Example 1, wherein the bottom portion includes at least one bottom portion for each of the filter housings, and the bottom portions are detachably attached to a base.

Example 5

The filter system of Example 4, the base including at least two receptacles, one receptacle for each bottom portion of each filter housing.

Example 6

The filter system of Example 5, each receptacle including a collar portion accepting the bottom portion of the housing.

Example 7

The filter system of Example 5, each housing having a cylindrical bottom portion, and each receptacle including a collar portion that mates with the bottom portion of the housing.

Example 8

The filter system of Example 5, each housing having a cylindrical bottom portion, and each receptacle including a collar portion that mates with the bottom portion of the housing.

Example 9

The filter system of Example 5, each housing having a cylindrical bottom portion that includes a groove, and each receptacle including a collar portion that mates with the bottom portion of the housing by fitting into the groove of the bottom portion of the housing.

Example 10

The filter system of Example 1, further comprising: a fluid distributor within the top portion that includes channels to distribute filtered and unfiltered fluid.

Example 11

The filter system of Example 1, further comprising: a housing cap within the top portion detachably attached to each housing.

Example 12

The filter system of Example 1, further comprising a manifold having a clip, wherein the clip attaches the connector to thereby connect the manifold to the top portion.

Example 13

The filter system of Example 6, further comprising a rotating shaft that attaches to the manifold, and when turned, detaches the clip from the bottom portion.

Example 14

The filter system of Example 2, wherein the filter housing includes a filter cap that can be attached to a fluid distributor.

Example 15

The filter system of Example 1, wherein the inlet and outlet of the top portion connect to an inlet and outlet on the manifold and the manifold includes one or more valves that automatically close when the top portion is disconnected from the manifold.

Example 16

A method comprising:
detaching a filter unit from a manifold;
detaching a top portion of a first filter housing of the filter unit from a bottom portion of the first filter housing of the filter unit;
detaching a top portion of a second filter housing of the filter unit from a bottom portion of the second filter housing of the filter unit;
removing a first used filter from the first filter housing;
removing a second used filter from the second filter housing;
placing a first new filter in the first filter housing;
placing a second new filter in the second filter housing;
attaching the top portion of the first filter housing of the filter unit to the bottom portion of the first filter housing of the filter unit;
attaching the top portion of the second filter housing of the filter unit to the bottom portion of the second filter housing of the filter unit;
attaching the filter unit to the manifold.

Example 17

The method of Example 16,
the detaching the filter unit from the manifold including at least turning a shaft, which when rotated causes the filter unit to release from the manifold.

Example 18

A filter system comprising:
a top portion having an inlet, an outlet, and a connector for detachably connecting the top portion from a manifold; wherein the inlet and the outlet separate from the connector;
at least one filter housing;
at least one removable filter;
wherein the filter housing detachably connects to the top portion so that the removable filter can be replaced.

Example 19

A filter system comprising:
a top portion having an inlet, an outlet and a connector for detachably connecting the top portion from a manifold; wherein the inlet and the outlet separate from the connector;
at least two filter housings and at least two removable filters, with at least one removable filter in each filter housing;
wherein the filter housing detachably connects to the top portion so that one or more of the at least two removable filters can be replaced.

ALTERNATIVES AND EXTENSIONS

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:
1. A filter system comprising:
a manifold having a clip with paired legs that open and close;
a top portion of a filter assembly having an inlet, an outlet and a connector for detachably connecting the top portion from the manifold, wherein the clip is config- ured to attach and detach the connector by changing a configuration of the legs between an open position and a closed position, to thereby connect the manifold to the top portion;

the top portion of the filter assembly having at least two filter housings and at least two removable filters, with at least one removable filter in each of the at least two filter housings;

a detachable bottom portion of the filter assembly that is detachably attached to a bottom of the top portion of the filter assembly by attaching to a bottom of the at least two filter housings, therein coupling the at least two housings to one another, via the bottom portion of the filter assembly, the bottom of the top portion of the filter assembly being an end of the top portion of the filter assembly that is furthest from the connector for detachably connecting the top portion of the filter assembly from the manifold;

wherein the detachable bottom portion detachably connects to the top portion so that one or more of the at least two removable filters can be replaced.

2. The filter system of claim 1, wherein the bottom portion includes at least one detachable section for each of the at least two filter housings, and the detachable section for each of the at least two filter housings each individually detach from a bottom of a different filter housing of the top portion to replace the removable filter.

3. The filter system of claim 1, each removable filter including a top surface, the filter assembly having a removable filter cap that rests on top of each of the removable filter, hindering incoming fluid from entering the removable filter by the top surface of the removable filter, the removable filter cap has a conduit that is part of the cap, the conduit attaches to and forms a fluid tight seal with an outlet channel in the top portion.

4. The filter system of claim 1, wherein the bottom portion include at least one bottom portion for each of the at least two filter housings, and the bottom portions are detachably attached to a base.

5. The filter system of claim 4, wherein the base includes at least two receptacles, one receptacle for each bottom portion of each of the at least two filter housings.

6. The filter system of claim 5, each receptacle including a collar portion accepting the bottom portion of one of the at least two filter housings.

7. The filter system of claim 5, each housing having a cylindrical bottom portion, and each receptacle including a collar portion that mates with the bottom portion of one of the at least two filter housings.

8. The filter system of claim 5, each filter housing having a cylindrical bottom portion having a bottom which is the bottom of the portion of the filter housing, and each receptacle including a collar portion at the bottom of the cylindrical bottom portion that mates with the bottom portion of one of the at least two filter housings.

9. The filter system of claim 5, each housing having a cylindrical bottom portion that includes a groove, and each receptacle including a collar portion that mates with the bottom portion of the housing by fitting into the groove of the bottom portion of one of the at least two filter housings.

10. The filter system of claim 1, further comprising: a fluid distributor within the top portion that includes at least one channel to distribute unfiltered fluid and at least one channel to collect filtered water.

11. The filter system of claim 1, each of the at least two filter housings having an inlet conduit, the filter system further comprising: a housing cap within the top portion detachably attached to each of the at least two filter housings, the housing cap including an inlet channel that is connected to the inlet conduit of each of the at least two filter housings, and as a result, the housing cap is configured to distribute incoming water to each of the at least two filter housings attached to the housing cap.

12. The filter system of claim 1, further comprising a rotating shaft that attaches to the manifold, the rotating shaft having a non-circular cross section, and is configured so that when the rotating shaft is turned, the rotating shaft detaches the clip, via the non-circular cross section, from the bottom portion.

13. The filter system of claim 2, wherein the at least two filter housings include a filter cap that can be attached to a fluid distributor.

14. The filter system of claim 1, wherein the inlet and outlet of the top portion connect to an inlet and outlet on the manifold and the manifold includes one or more valves that automatically close when the top portion is disconnected from the manifold.

15. The filter system of claim 12, wherein the rotating shaft rotates with respect to the manifold and the at least two filter housings, and the rotating shaft attaches to the manifold; and when the shaft is turned, wherein rotating the shaft pushes the legs of the clip open and releases the legs allowing the legs to close, and wherein pushing the legs open and allowing the legs to close attaches and detaches the bottom portion.

16. A method comprising:
    detaching a filter unit from a manifold;
    detaching a top portion of a first filter housing of the filter unit from a bottom portion of the first filter housing of the filter unit;
    detaching a top portion of a second filter housing of the filter unit from a bottom portion of the second filter housing of the filter unit;
    removing a first used filter from the first filter housing;
    removing a second used filter from the second filter housing;
    placing a first new filter in the first filter housing;
    placing a second new filter in the second filter housing;
    attaching the top portion of the first filter housing of the filter unit to the bottom portion of the first filter housing of the filter unit;
    attaching the top portion of the second filter housing of the filter unit to the bottom portion of the second filter housing of the filter unit;
    attaching the filter unit to a fluid distributor attached to the manifold;
    the first filter housing being attached to an inlet channel of the fluid distributor and an outlet channel of the fluid distributor and the second filter housing being attached to the inlet channel of the fluid distributor and the outlet channel of the fluid distributor, while connected, the first filter housing and the second filter housing form parallel paths for fluid flow between the inlet channel and the outlet channel, so that fluid that flows through one of the first filter housing and the second filter housing does not also flow through another of the first filter housing and the second filter housing;
    the detaching of the filter unit from the manifold including at least turning a shaft, via a shaft handle, the shaft being in mechanical communication with a clip, as result of the shaft being rotated, via the shaft handle, the clip changing between one of two configurations, causing the filter unit to release from the manifold, the two configurations of the clip being an opened and closed.

17. The filter system of claim 1, wherein the bottom portion includes at least one section for each of the at least two filter housings, and bottom portions of the at least two filter housings are detachably attached to a base; the base being part of the bottom portion of the at least two filter housings, the base couples the bottom portions of the at least two filter housings to one another, the base being located underneath and facing an underside of the at least two filter housings.

18. The filter system of claim 1, further comprising a rotating shaft that attaches to the manifold, the filter system being configured such that the rotation of the shaft causes the bottom portion to detach form the manifold.

\* \* \* \* \*